(12) United States Patent
Takeuchi et al.

(10) Patent No.: US 12,441,207 B2
(45) Date of Patent: Oct. 14, 2025

(54) CONTROL APPARATUS FOR VEHICLE

(71) Applicant: DENSO CORPORATION, Kariya (JP)

(72) Inventors: Yoshitomo Takeuchi, Kariya (JP); Kousuke Baba, Kariya (JP); Yoshihiro Sato, Kariya (JP); Taisuke Kurachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 472 days.

(21) Appl. No.: 17/729,630

(22) Filed: Apr. 26, 2022

(65) Prior Publication Data

US 2022/0250499 A1     Aug. 11, 2022

Related U.S. Application Data

(63) Continuation of application No. PCT/JP2020/040326, filed on Oct. 27, 2020.

(30) Foreign Application Priority Data

Oct. 31, 2019  (JP) ................................. 2019-199436
Apr. 1, 2020  (JP) ................................. 2020-066083

(51) Int. Cl.
*B60L 53/62*     (2019.01)
*B60L 7/10*     (2006.01)
(Continued)

(52) U.S. Cl.
CPC ................. *B60L 53/62* (2019.02); *B60L 7/10* (2013.01); *B60L 15/20* (2013.01); *B60L 58/16* (2019.02); *B60L 2240/545* (2013.01)

(58) Field of Classification Search
CPC .. B60L 53/62; B60L 58/16; B60L 7/10; B60L 15/20; B60L 2240/545;
(Continued)

(56) References Cited

U.S. PATENT DOCUMENTS

| | | | |
|---|---|---|---|
| 9,290,108 B2* | 3/2016 | Payne | ................. G01C 21/3461 |
| 2013/0043844 A1* | 2/2013 | Tashiro | ............... H02J 7/00306 |
| | | | 320/128 |

(Continued)

FOREIGN PATENT DOCUMENTS

| | | | |
|---|---|---|---|
| CN | 108944506 A | * | 12/2018 |
| CN | 109747625 A | * | 5/2019 |

(Continued)

OTHER PUBLICATIONS

English Translation of JP-2015171208-A (Year: 2015).*
(Continued)

*Primary Examiner* — Ramya P Burgess
*Assistant Examiner* — Preston Jay Miller
(74) *Attorney, Agent, or Firm* — Oliff PLC

(57) ABSTRACT

A control apparatus for a vehicle determines whether to perform either a first control or a second control. In the first control, power is transferred between a power supply facility outside a vehicle and a power storage apparatus during stopping of the vehicle. In the second control, power is transferred between a rotating electric machine and the power storage apparatus through an inverter during traveling of the vehicle. In the first control, the apparatus performs control of the inverter to set a controlled variable to be equal to or less than a first limit value. In the second control, the apparatus performs control of the inverter to set the controlled variable to be equal to or less than a second limit value. The apparatus sets either the first or second limit values to a value suppressing a decrease in a maximum dischargeable power of the power storage apparatus.

12 Claims, 17 Drawing Sheets

(51) Int. Cl.
*B60L 15/20* (2006.01)
*B60L 58/16* (2019.01)

(58) Field of Classification Search
CPC ........ B60L 15/2009; B60L 7/24; B60L 58/25;
B60L 7/14; Y02E 60/10; Y02T 90/12;
B60T 8/17; B60T 8/171; H01M 10/44;
H01M 10/48; H02J 7/00; H02J 7/04
USPC .......................................................... 701/22
See application file for complete search history.

(56) References Cited

U.S. PATENT DOCUMENTS

| | | | | |
|---|---|---|---|---|
| 2013/0166119 | A1* | 6/2013 | Kummer | H01M 10/625 |
| | | | | 701/22 |
| 2014/0042968 | A1 | 2/2014 | Hiroe | |
| 2015/0006933 | A1* | 1/2015 | Park | B60L 58/15 |
| | | | | 713/323 |
| 2016/0107526 | A1* | 4/2016 | Jin | B60L 7/10 |
| | | | | 307/10.1 |
| 2018/0079318 | A1* | 3/2018 | Ha | B60L 53/66 |
| 2018/0099577 | A1* | 4/2018 | Nagata | B60L 58/24 |
| 2018/0304765 | A1* | 10/2018 | Newman | B60L 58/26 |
| 2019/0157882 | A1* | 5/2019 | Sherback | H02J 7/0013 |
| 2019/0173136 | A1* | 6/2019 | Seo | H01M 10/486 |
| 2019/0315232 | A1* | 10/2019 | Ing | B60L 58/26 |
| 2021/0126474 | A1* | 4/2021 | Zhang | H02J 7/00041 |

FOREIGN PATENT DOCUMENTS

| | | | |
|---|---|---|---|
| JP | 2005-117727 A | | 4/2005 |
| JP | 4595829 B2 | | 12/2010 |
| JP | 2013162645 A | * | 8/2013 |
| JP | 2013169036 A | * | 8/2013 |
| JP | 2015-033154 A | | 2/2015 |
| JP | 2015171208 A | * | 9/2015 |

OTHER PUBLICATIONS

English Translation of CN-108944506-A (Year: 2018).*
English Translation of JP-2013162645-A (Year: 2013).*
English Translation of CN-109747625-A (Year: 2019).*

* cited by examiner

Fig. 12 (a) KHin
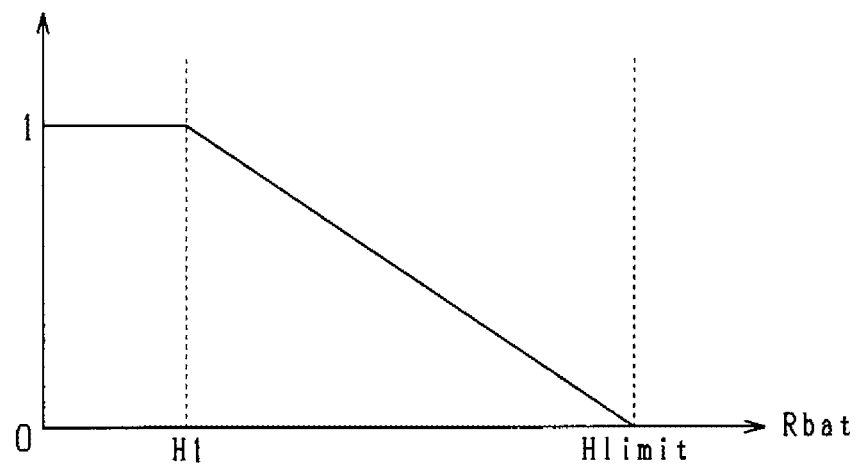
Fig. 12 (b) KHout
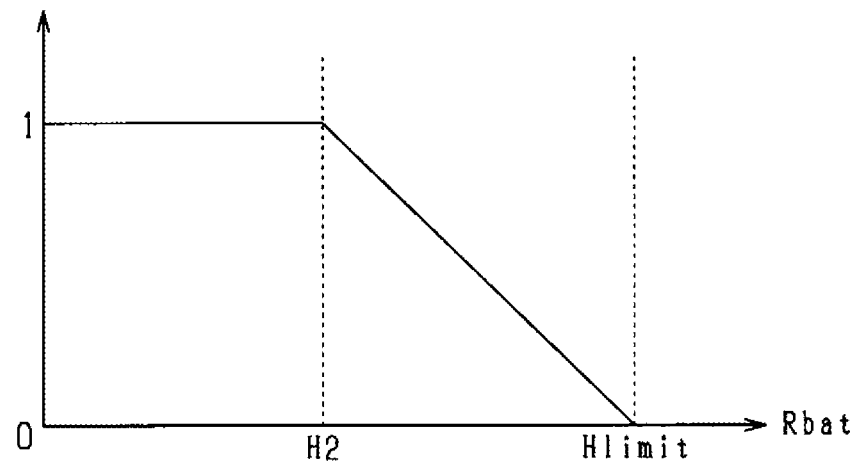

CONTROL APPARATUS FOR VEHICLE

CROSS-REFERENCE TO RELATED APPLICATION

The present application is a continuation application of International Application No. PCT/JP2020/040326, filed on Oct. 27, 2020, which claims priority to Japanese Patent Application No. 2019-199436, filed on Oct. 31, 2019, and Japanese Patent Application No. 2020-066083, filed on Apr. 1, 2020. The contents of these applications are incorporated herein by reference in their entirety.

BACKGROUND

Technical Field

The present disclosure relates to a control apparatus for a vehicle.

Related Art

A control apparatus for a vehicle that includes a power storage apparatus, an inverter that is electrically connected to the power storage apparatus, and a rotating electric machine that is electrically connected to the inverter is known.

SUMMARY

One aspect of the present disclosure provides a control apparatus for a vehicle that includes a power storage apparatus, an inverter that is electrically connected to the power storage apparatus, and a rotating electric machine that is electrically connected to the inverter. The control apparatus determines whether to perform either of a first control and a second control. In the first control, electric power is transferred between a power supply facility external to the vehicle and the power storage apparatus during stopping of the vehicle. In the second control, electric power is transferred between the rotating electric machine and the power storage apparatus through the inverter during traveling of the vehicle. In response to the first control being determined to be performed, the control apparatus performs control of the inverter to set a controlled variable that is either of electric power and a current that is transferred between the power supply facility and the power storage apparatus to be equal to or less than a first limit value. In response to the second control being determined to be performed, the control apparatus performs control of the inverter to set a controlled variable that is either of electric power and a current that is transferred between the rotating electric machine and the power storage apparatus to be equal to or less than a second limit value. The control apparatus sets at least either of the first limit value and the second limit value to a value that suppresses decrease in drivability of the vehicle.

BRIEF DESCRIPTION OF DRAWINGS

In the accompanying drawings:

FIGS. 12A and 12B are diagrams illustrating a setting method for a degradation coefficient;

DESCRIPTION OF THE EMBODIMENTS

Figure 1:
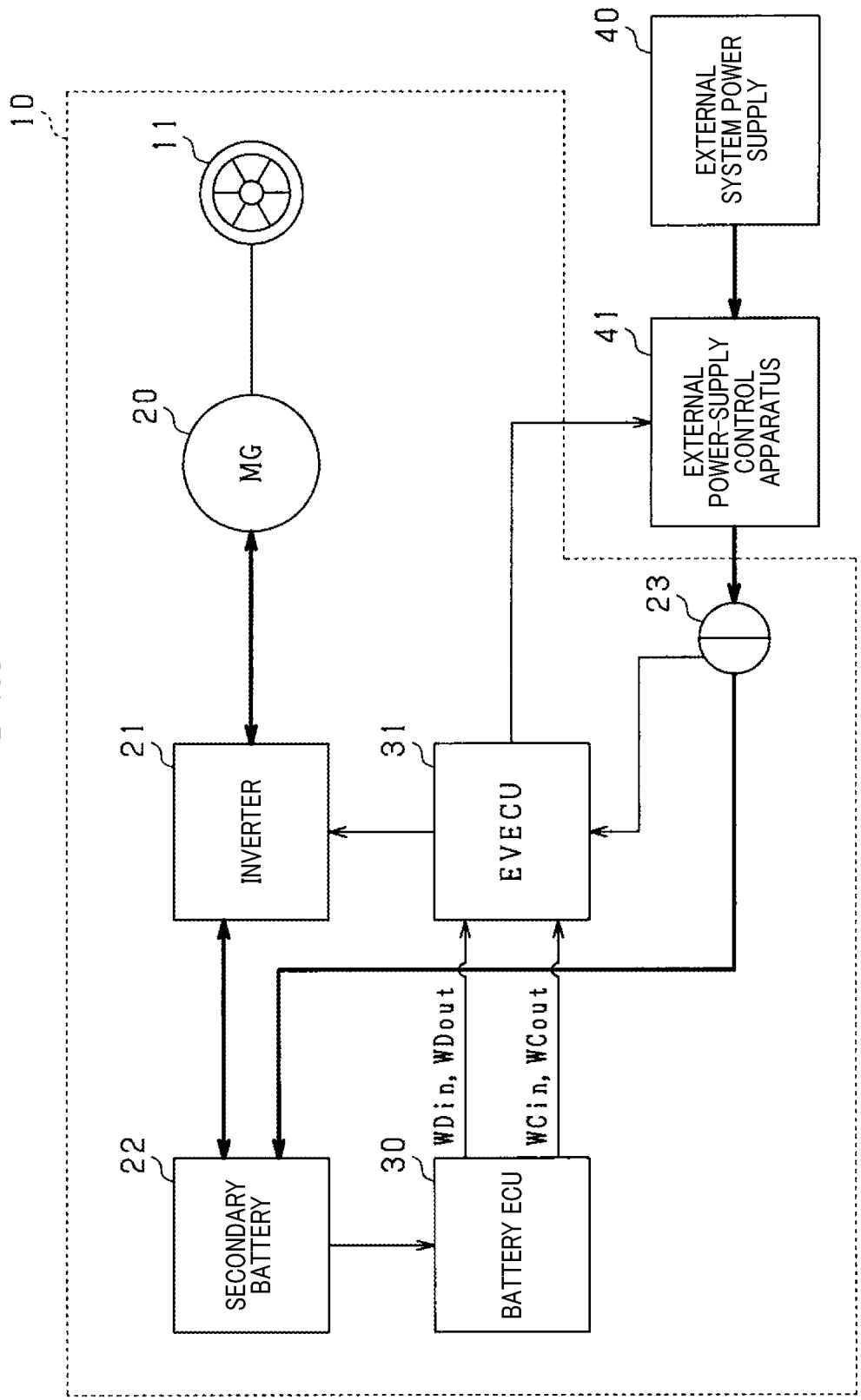
FIG. 1 is an overall configuration diagram illustrating an onboard system according to a first embodiment.

Conventionally, as can be seen in Japanese Patent Publication No. 4595829, for example, a control apparatus for a vehicle that is applied to a vehicle that includes a power storage apparatus, an inverter that is electrically connected to the power storage apparatus, and a rotating electric machine that is electrically connected to the inverter is known.

This control apparatus performs either of a first control in which electric power is transferred between a power supply facility external to the vehicle and the power storage apparatus during stopping of the vehicle, and a second control in which electric power is transferred between the rotating electric machine and the power storage apparatus through the inverter during traveling of the vehicle.

For example, when a user attempts to charge the power storage apparatus, if the control apparatus performs the first control, because electric power is transferred between the power supply facility and the power storage apparatus, a temperature of the power storage apparatus increases.

Here, when the temperature of the power storage apparatus reaches a limit temperature thereof, charging/discharging power of the power storage apparatus is significantly limited. When the user attempts to cause the vehicle to travel under such limitations, even if the control apparatus performs the second control, drivability may decrease, such as the vehicle not being able to travel or, even if the vehicle is able to travel, intended travel not being actualized.

It is thus desired to provide a control apparatus for a vehicle that is capable of suppressing decrease in drivability.

A first exemplary embodiment provides a control apparatus for a vehicle that is applied to a vehicle that includes a power storage apparatus, an inverter that is electrically connected to the power storage apparatus, and a rotating electric machine that is electrically connected to the inverter. The control apparatus includes a determining unit, a control unit, and a setting unit.

The determining unit determines whether to perform either of a first control in which electric power is transferred between a power supply facility external to the vehicle and the power storage apparatus during stopping of the vehicle, and a second control in which electric power is transferred between the rotating electric machine and the power storage apparatus through the inverter during traveling of the vehicle.

In response to the determining unit determining that the first control is being performed, the control unit performs control of the inverter to set a controlled variable that is either of electric power and a current that is transferred between the power supply facility and the power storage apparatus to be equal to or less than a first limit value. In response to the determining unit determining that the second control is being performed, the control unit performs control of the inverter to set a controlled variable that is either of electric power and a current that is transferred between the rotating electric machine and the power storage apparatus to be equal to or less than a second limit value.

The setting unit sets at least either of the first limit value and the second limit value to a value that suppresses decrease in drivability of the vehicle.

According to the first exemplary embodiment, decrease in drivability can be suppressed.

Here, specifically, for example, a following configuration can be used as a setting method for the limit values that suppress decrease in drivability.

According to a second exemplary embodiment, the first control is charging control in which the power storage apparatus is charged from the power supply facility. Before start of charging of the power storage apparatus when an execution instruction for a current charging control is issued, the setting unit predicts a temperature of the power storage apparatus when the current charging control in which the power storage apparatus is charged at a prescribed power is assumed to be completed. The setting unit determines whether the predicted temperature is equal to or less than a requested temperature that is the temperature of the power storage apparatus that sets a maximum dischargeable power of the power storage apparatus to a traveling requested power of the vehicle, and decreases the prescribed power that is used to predict the temperature of the power storage apparatus until the predicted temperature is determined to be equal to or less than the requested temperature. The setting unit sets the first limit value to the prescribed power at which the predicted temperature is determined to be equal to or less than the requested temperature.

From a perspective of user-friendliness, the charging time for the power storage apparatus by the charging control is preferably as short as possible. When the charging time is shortened, the charging power from the power supply facility to the power charging apparatus is required to be increased. However, in this case, an amount of heat generation in the power storage apparatus during charging of the power storage apparatus increases, and the temperature of the power storage apparatus upon completion of the charging control is high. Consequently, when the vehicle is subsequently made to travel, the maximum dischargeable power from the power storage apparatus may decrease and drivability may decrease.

Therefore, according to the second exemplary embodiment, before the start of charging of the power storage apparatus when the execution instruction for the current charging control is issued, the temperature of the power storage apparatus when the current charging control in which the power storage apparatus is charged at the prescribed power is assumed to be completed is predicted. Then, whether the predicted temperature is equal to or greater than the above-described requested temperature is determined. Here, the prescribed temperature that is used to predict the temperature of the power storage apparatus is decreased until the predicted temperature is determined to be equal to or less than the requested temperature. In addition, the first limit value that is used in the charging control is set to the prescribed power at which the predicted temperature is determined to be equal to or less than the requested temperature.

According to the second exemplary embodiment described above, the maximum dischargeable power of the power storage apparatus can be set closer to the traveling requested power of the vehicle. Consequently, decrease in drivability can be favorably suppressed while the power storage apparatus is protected from overheating abnormalities.

In addition, specifically, for example, a following configuration can be used as a setting method for the limit values that suppress decrease in drivability.

According to a third exemplary embodiment, the first control is charging control in which the power storage apparatus is charged from the power supply facility. A period from start of traveling of the vehicle after completion of the charging control until the charging control is started again is a single traveling cycle. Before start of charging of the power storage apparatus when an execution instruction for a current charging control is issued, the setting unit predicts a first temperature that is a temperature of the power storage apparatus when the current charging control in which the power storage apparatus is charged at a prescribed power is assumed to be completed, based on an average time from start to completion of the charging control and an average charging power of the power storage apparatus from the start to the completion of the charging control. The setting unit predicts a second temperature that is a temperature of the power storage apparatus when a next single traveling cycle that is performed after the current charging control is assumed to be completed, based on the predicted first temperature, an average discharging power of the power storage apparatus in the single traveling cycle, and an average time that is required for the single traveling cycle. The setting unit determines whether the predicted second temperature is equal to or less than a requested temperature that is the temperature of the power storage apparatus that sets a maximum dischargeable power of the power storage apparatus to a traveling requested power of the vehicle, and decreases the prescribed power that is used to predict the second temperature until the predicted second temperature is determined to be equal to or less than the requested temperature. The setting unit sets the first limit value to the prescribed power at which the predicted second temperature is determined to be equal to or less than the requested temperature.

According to the third exemplary embodiment, the maximum dischargeable power of the storage apparatus can be prevented from significantly decreasing in relation to the requested power in the next single traveling cycle that is performed after the current charging control. Consequently, decrease in drivability in the next single traveling cycle can be favorably suppressed while the power storage apparatus is protected from overheating abnormalities.

In addition, specifically, for example, a following configuration can be used as a setting method for the limit values that suppress decrease in drivability.

According to a fourth exemplary embodiment, the setting unit sets the first limit value to a value that is less than the second limit value.

According to the fourth exemplary embodiment, in response to the first control being determined to be performed, control of the inverter is performed to set the controlled variable that is either of the electric power and the current that is transferred between the power supply facility and the power storage apparatus to be equal to or less than the first limit value. In response to the second control being determined to be performed, control of the inverter is performed to set the controlled variable that is either of the electric power and the current that is transferred between the rotating electric machine and the power storage apparatus to be equal to or less than the second limit value.

Here, when the charging/discharging power of the power storage apparatus during traveling of the vehicle is significantly limited, increase in the decrease in drivability can be considered. Meanwhile, when the charging/discharging power of the power storage apparatus during stopping is significantly limited, while the charging time of the power storage apparatus may become longer, drivability is considered to not decrease because the vehicle is not traveling.

With focus on this point, the first limit value that is used in the first control is set to a value that is less than the second limit that is used in the second control. As a result of this setting, the first control being performed and the electric power that is transferred between the power supply facility and the power storage apparatus increasing can be prevented. Temperature increase in the power storage battery when the first control is being performed can be suppressed. As a result, when the vehicle is subsequently made to travel by the second control, the temperature of the power storage apparatus can be set to a level that is low in relation to the limit value thereof. Consequently, a state in which the vehicle cannot be made to travel can be avoided, and decrease in drivability can be suppressed.

In addition, specifically, for example, a following configuration can be used as a setting method for the limit values that suppress decrease in drivability.

A fifth exemplary embodiment includes a degradation information acquiring unit that acquires a degree of degradation of the power storage apparatus. The setting unit sets the first limit value to a value that is smaller as the degree of degradation increases, when the degree of degradation exceeds a first predetermined degree; and sets the second limit value to a value that is smaller as the degree of degradation increases, when the degree of degradation exceeds a second predetermined degree.

According to the fifth exemplary embodiment, the limit values that can suppress decrease in drivability while protecting the power storage apparatus from overheating abnormalities can be appropriately set based on progression of degradation of the power storage apparatus.

The above-described exemplary embodiments of the present disclosure will be further clarified through the detailed description below, with reference to the accompanying drawings.

First Embodiment

A first embodiment actualizing a control apparatus for a vehicle of the present disclosure will hereinafter be described with reference to the drawings. A cooling control apparatus according to the present embodiment is mounted in a vehicle such as an electric car that includes only a rotating electric machine as a traveling power source.

As shown in FIG. 1, a vehicle 10 includes a rotating electric machine 20, an inverter 21, and a secondary battery 22 that serves as a power storage apparatus. According to the present embodiment, the rotating electric machine 20 has a winding of three phases and is, for example, a permanent-magnet-type synchronous motor. A rotor of the rotating electric machine 20 is capable of transferring power to and from a driving wheel 11 of the vehicle 10. That is, the rotating electric machine 20 serves as a traveling power source of the vehicle 10.

The inverter 21 is electrically connected to a stator winding of the rotating electric machine 20. The inverter 21 includes upper and lower arm switches. The secondary battery 22 is an assembled battery that is composed of a series-connection body of a plurality of cells. For example, the secondary battery 22 may be a lithium-ion storage battery or a nickel-hydrogen storage battery.

The vehicle 10 includes a charging inlet 23. The charging inlet 23 can be electrically connected to a power supply control apparatus 41 that is set outside the vehicle 10. For example, the power supply control apparatus 41 may be a standard charger or a quick charger. As a result of the power supply control apparatus 41 and the charging inlet 23 being electrically connected, electric power can be supplied from an external system power supply 40 to the secondary battery 22 through the power supply control apparatus 41 and the charging inlet 23, and electric power can be returned from the secondary battery 22 to the external system power supply 41 through the charging inlet 23 and the power supply control apparatus 41. Here, for example, a state in which electric power is returned is a state in which a smart grid is available.

The vehicle 10 includes a battery electronic control unit (ECU) 30 that monitors the secondary battery 22 and an EVECU 31 that provides a function as a cooling control apparatus. The battery ECU 30 detects a voltage of each cell of the secondary battery 22, a battery temperature Tbat that is a temperature of the secondary battery 22, and a current that flows to the secondary battery 22. The battery ECU 30 calculates a charging rate (state of charge [SOC]) of the secondary battery 22 and the like based on these detection values. The detected voltage, current, and battery temperature Tbat, and the calculated SOC are inputted to the EVECU 31.

The EVECU 31 performs switching control of the upper and lower arm switches that configure the inverter 21. Specifically, the EVECU 31 performs power-running driving control that is switching control in which direct-current power that is outputted from the secondary battery 22 is converted to alternating-current power and supplied to the rotating electric machine 20 to rotate the rotor of the rotating electric machine 20. In addition, the EVECU 31 performs regenerative driving control that is switching control in which alternating-current power that is generated by the rotating electric machine 20 is converted to direct-current power and supplied to the secondary battery 22 to charge the secondary battery 22.

Figure 2:
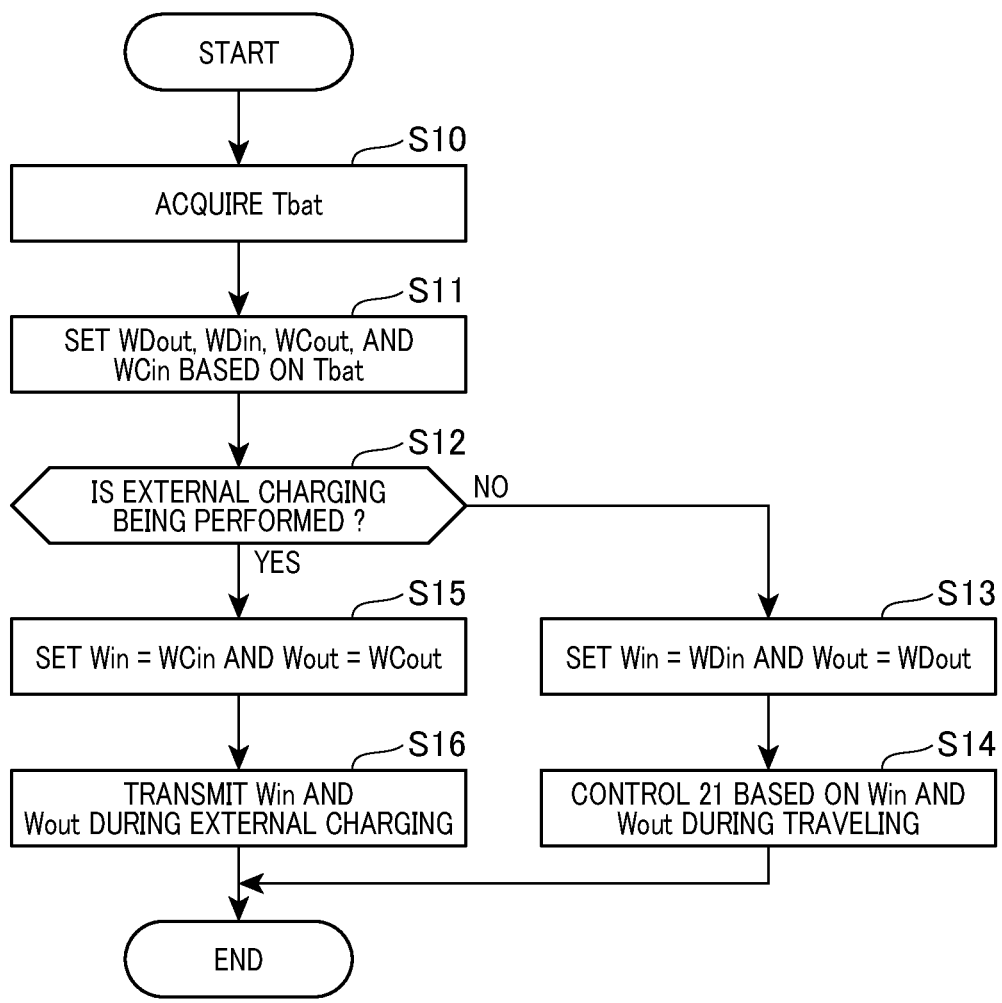
FIG. 2 is a flowchart illustrating steps in a process performed by an EVECU and a battery ECU.

FIG. 2 shows steps in a process that is performed through cooperation between the EVECU 31 and the battery ECU 30. For example, this process may be repeatedly performed at a predetermined control cycle.

At step S10, the battery ECU 30 acquires the battery temperature Tbat. The process at step S10 corresponds to a temperature acquiring unit.

At step S11, the battery ECU 30 sets a traveling discharging-power limit value WDout and a traveling charging-power limit value WDin that correspond to a second limit value, and a charging discharging-power limit value WCout and a charging charging-power limit value WCin that correspond to a first limit value, based on the acquired battery temperature Tbat. The limit values WDout, WDin, WCout, and WCin are stored in a memory that serves as a storage unit that is provided in the battery ECU 30 as map information that is associated with the battery temperature Tbat. The memory is a non-transitory, tangible recording medium other than a read-only memory (ROM) (such as a non-volatile memory other than the ROM). Setting methods for the limit values WDout, WDin, WCout, and WCin will be described in detail hereafter. The battery ECU 30 transmits the limit values WDout, WDin, WCout, and WCin to the EVECU 31. Here, the process at step S11 corresponds to a setting unit.

At step S12, the EVECU 31 determines whether external charging control is being performed. Specifically, the EVECU 31 may determine that the external charging control is being performed when a signal that indicates that the power supply control apparatus 41 is electrically connected to the charging inlet 23 is received from the charging inlet 23.

When determined that the external charging control is not performed at step S12, the EVECU 31 determines that the vehicle 10 is in a state of being made to travel and proceeds to step S13. At step S13, the EVECU 31 sets a command charging-power limit value Win to the received traveling charging-power limit value WDin and sets a command discharging-power limit value Wout to the received traveling discharging-power limit value WDout.

At step S14, the EVECU 31 performs the power-running driving control or the regenerative driving control (corresponding to "second control") during traveling of the vehicle 10. Specifically, when the power-running driving control is being performed, the EVECU 31 sets electric power that is supplied from the secondary battery 22 to the rotating electric machine 20 through the inverter 21 to be equal to or less than the command discharging-power limit value Wout set at step S13.

Meanwhile, when the regenerative driving control is being performed, the EVECU 31 sets electric power that is supplied from the rotating electric machine 20 to the secondary battery 22 through the inverter 21 to be equal to or less than the command charging-power limit value Win set at step S13. Here, for example, the electric power that is supplied from the secondary battery 22 to the rotating electric machine 20 and the electric power that is supplied from the rotating electric machine 20 to the secondary battery 22 may be calculated from the voltage and the current of the secondary battery 22 that are acquired from the battery ECU 30.

When determined that the external charging control is being performed at step S12, the EVECU 31 proceeds to step S15. At step S15, the EVECU 31 sets the command charging-power limit value Win to the received charging charging-power limit value WCin and sets the command discharging-power limit value Wout to the received charging discharging-power limit value WCout.

At step S16, the EVECU 31 transmits the command charging-power limit value Win and the command discharging-power limit value Wout set at step S15 to the power supply control apparatus 41. As a result, the power supply control apparatus 41 performs control such that, when charging the secondary battery 22 through the charging inlet 23, the electric power that is supplied from the power supply control apparatus 41 to the secondary battery 22 through the charging inlet 23 is equal to or less than the received command charging-power limit value Win.

Meanwhile, the power supply control apparatus 41 performs control such that, when electric power is supplied from the secondary battery 22 to the external system power supply 40 through the charging inlet 23 and the power supply control apparatus 41, the electric power is set to be equal to or less than the received command discharging-power limit value Wout.

Here, for example, the electric power that is supplied from the power supply control apparatus 41 to the secondary battery 22 and the electric power that is supplied from the secondary battery 22 to the external system power supply 40 through the power supply control apparatus 41 may be calculated based on the voltage and the current of the secondary battery 22 that are acquired from the battery ECU 30. In addition, the control performed by the power supply control apparatus 41 corresponds to the second control. The battery ECU 30 and the EVECU 31 correspond to a control unit.

Next, the setting method for the limit values WDout, WDin, WCout, and WCin based on the battery temperature Tbat will be described with reference to FIG. 3.

Figure 3:
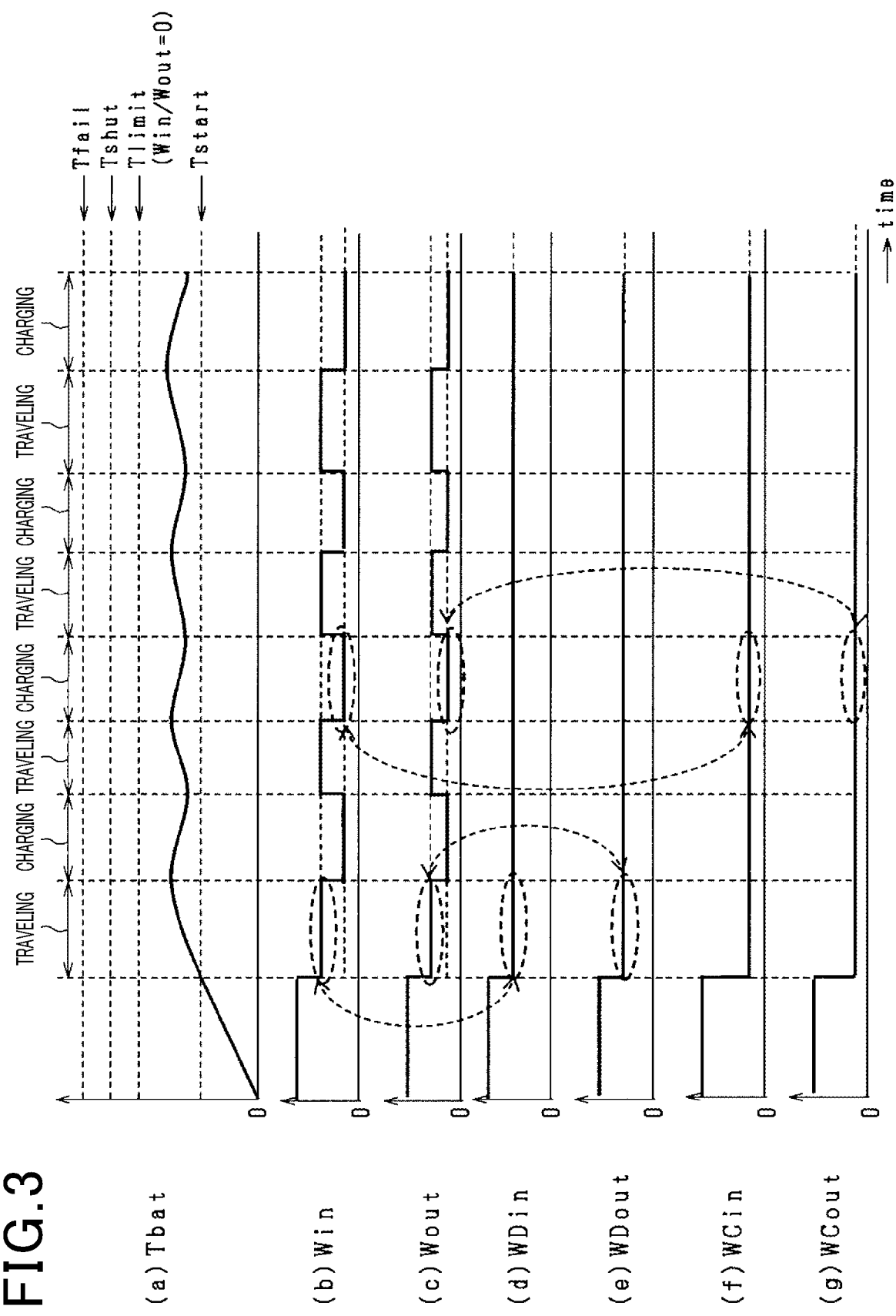
FIG. 3 is a time chart illustrating a setting mode of each limit value based on battery temperature.

FIG. 3(a) shows transitions in the battery temperature Tbat, and FIGS. 3(b) and (c) show transitions in the command charging-power limit value Win and the command discharging-power limit value Wout. FIGS. 3(d) and (e) show transitions in the traveling charging-power limit value WDin and the traveling discharging-power limit value WDout. FIGS. 3(f) and (g) show transitions in the charging charging-power limit value WCin and the charging discharging-power limit value WCout. In addition, a "traveling" period shown in FIG. 3 indicates a period over which a negative determination is made at step S12 and a "charging" period indicates a period over which an affirmative determination is made at step S12.

When the battery temperature Tbat is equal to or greater than a limit start temperature Tstart, the battery ECU 30 sets the limit values WDout, WDin, WCout, and WCin to values that are less than those when the battery temperature Tbat is less than the limit start temperature Tstart.

When the battery temperature Tbat is equal to or greater than the limit start temperature Tstart (such as 60° C.), the battery ECU 30 sets the charging charging-power limit value WCin and the charging discharging-power limit value WCout to values that are less than the traveling charging-power limit value WDin and the traveling discharging-power limit value WDout.

When the battery temperature Tbat is equal to or greater than a limit temperature Tlimit that is higher than the limit start temperature Tstart, the battery ECU 30 sets the limit values WDout, WDin, WCout, and WCin to 0.

Here, for example, when "Tstart≤Tbat≤Tlimit," the battery ECU 30 may set the limit values WDout, WDin, WCout, and WCin to decrease as the battery temperature Tbat increases. In addition, Tshut shown in FIG. 3 is a system shutdown temperature that is higher than the limit temperature Tlimit and is used to shut down an onboard system. Tfail is a temperature (such as 80° C.) that is higher than the system shutdown temperature Tshut and is a temperature at which failure of the secondary battery 22 is expected to occur.

According to the present embodiment described in detail above, following effects are achieved.

When the battery temperature Tbat is equal to or greater than the limit start temperature Tstart, the charging charging-power limit value WCin and the charging discharging-power limit value WCout are set to values that are less than the traveling charging-power limit value WDin and the traveling discharging-power limit value WDout. As a result of this setting, the charging power of the secondary battery 22 when the external charging control is being performed can be prevented from increasing, and the temperature of the secondary battery 22 can be prevented from becoming excessively high in relation to the limit start temperature Tstart.

In particular, during stopping, cooling of the secondary battery 22 by traveling wind of the vehicle 10 cannot be expected. Therefore, there is great advantage in the charging charging-power limit value WCin and the charging discharging-power limit value WCout being set to small values. According to the present embodiment, after the external charging control, when the vehicle 10 is made to travel by the power-running driving control, the temperature of the secondary battery 22 can be less than the limit temperature Tlimit. Consequently, a state in which the vehicle 10 cannot be made to travel can be avoided, and decrease in drivability can be suppressed.

In comparison to a vehicle that includes only an internal combustion engine as the traveling power source that is capable of transferring power to the driving wheel, and a hybrid vehicle and a plug-in hybrid vehicle that include the rotating electric machine in addition to the internal combustion engine as the traveling power source, in the electric car that includes only the rotating electric machine as the traveling power source, when the charging/discharging power of the onboard secondary battery 22 is limited, drivability and user-friendliness significantly decrease. Therefore, there is particularly great advantage in the process shown in FIG. 2 being applied to the vehicle 10 according to the present embodiment is particularly great.

Second Embodiment

Figure 4:
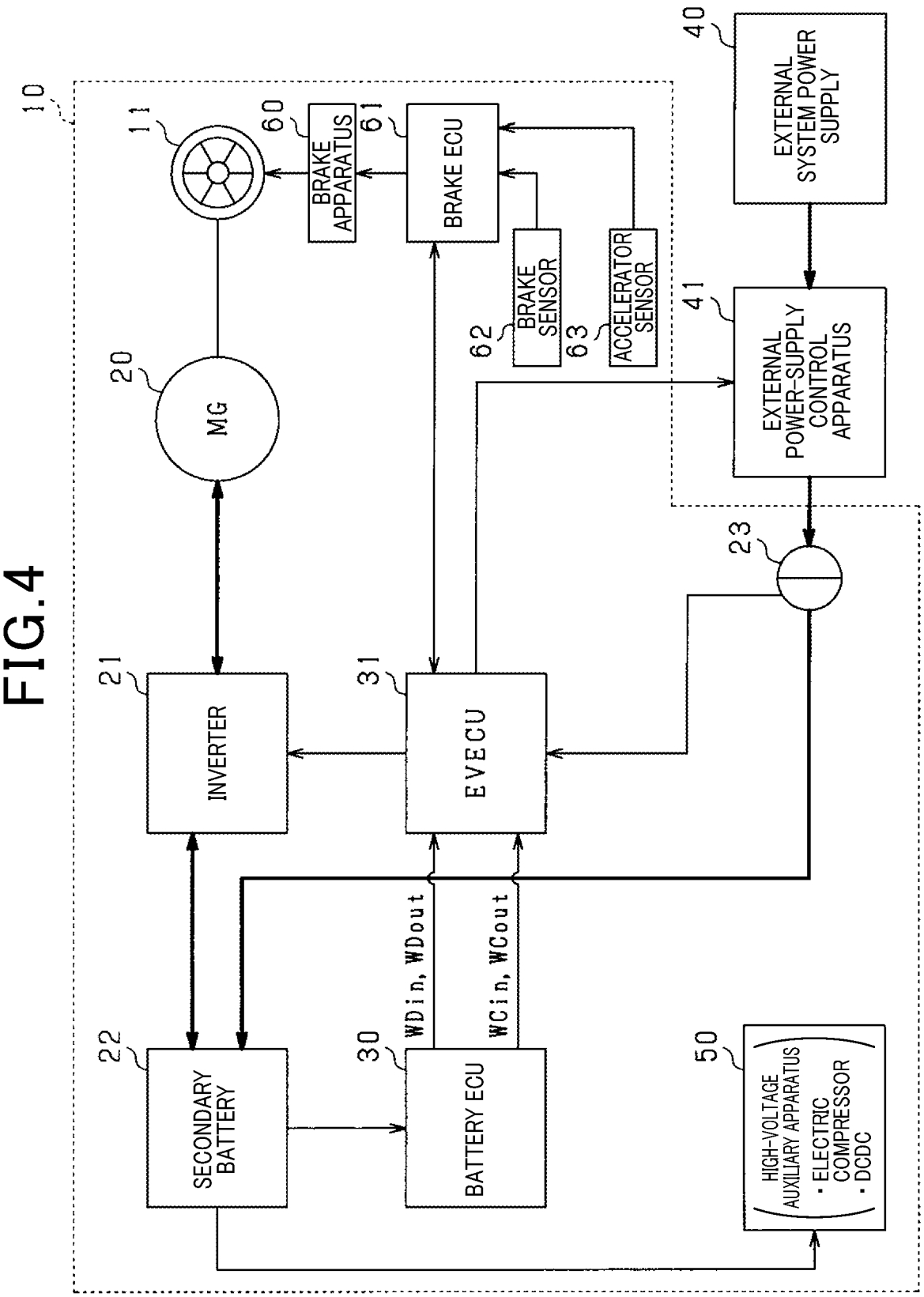
FIG. 4 is an overall configuration diagram illustrating an onboard system according to a second embodiment.

A second embodiment will be described below, mainly focusing on differences with the first embodiment. FIG. 4 shows an overall configuration diagram of an onboard system according to the present embodiment. In FIG. 4, configurations that are identical to those shown in FIG. 1 above are given the same reference numbers for convenience.

The vehicle 10 includes a high-voltage auxiliary apparatus 50 that serves as an electrical apparatus. The high-voltage auxiliary apparatus 50 includes an electric compressor and a direct current-to-direct current (DCDC) converter. The electric compressor configures an in-cabin air-conditioning apparatus, and is supplied electric power from the secondary battery 22 and driven to circulate a coolant of an onboard refrigeration cycle. The DCDC converter steps down an output voltage of the secondary battery 22 and supplies the voltage to an onboard low-voltage load. For example, the low-voltage load may include at least either of a low-voltage storage battery and a low-voltage electrical load. The low-voltage storage battery may be a storage battery that has a lower output voltage than the secondary battery 22 and may be, for example, a lead storage battery.

The vehicle 10 includes a brake apparatus 60 and a brake ECU 61. The brake apparatus 60 generates braking force by applying frictional force to wheels including the driving wheel 11. The brake apparatus 60 includes a master cylinder, a brake pad, and the like that operate based on depression of a brake pedal that serves as a brake operating member. The brake ECU 61 performs control of the brake apparatus 60 such that a mechanical brake torque is generated in the brake apparatus 60.

The vehicle 10 includes a brake sensor 62 and an accelerator sensor 63. The brake sensor 62 detects a brake stroke Sb that is an amount of depression of the brake pedal by a driver. The accelerator sensor 63 detects an accelerator stroke Sa that is an amount of depression of an accelerator pedal that serves as an accelerator operating member. Detection values of the brake sensor 62 and the accelerator sensor 63 are transmitted to the brake ECU 61.

Figure 5:
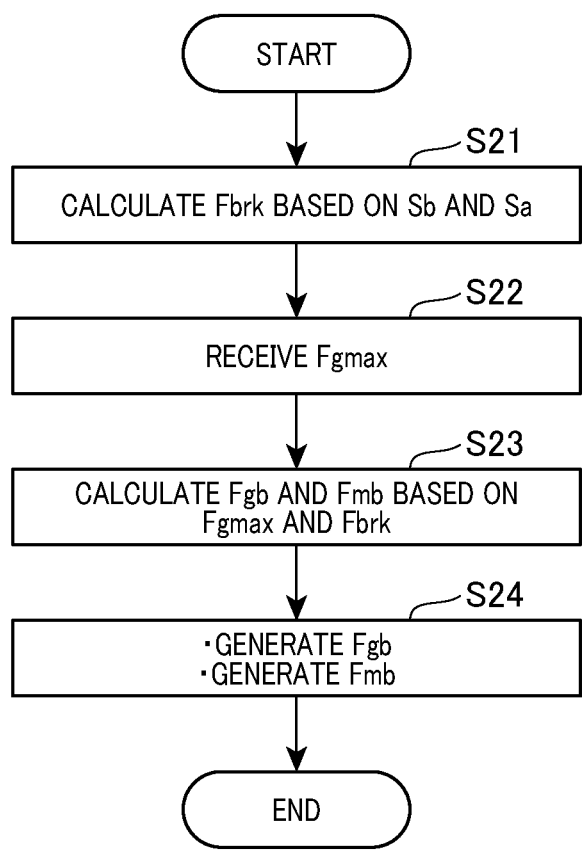
FIG. 5 is a flowchart illustrating steps in a process performed by a brake ECU and an EVECU.

Next, processes that are performed through cooperation between the EVECU 31 and the battery ECU 30 will be described with reference to FIG. 5.

At step S21, the brake ECU 61 acquires the brake stroke Sb that is detected by the brake sensor 62 and the accelerator stroke Sa that is detected by the accelerator sensor 63, and calculates a total braking force Fbrk to be applied to the wheels based on the acquired strokes Sb and Sa.

At step S22, the brake ECU 61 receives a regenerative braking force Fgmax from the EVECU 31. The regenerative braking force Fgmax is a current maximum value of the braking force that can be applied to the wheels by the regenerative driving control.

At step S23, the brake ECU 61 calculates a regenerative requested braking force Fgb and a mechanical requested braking force Fmb based on the regenerative braking force Fgmax and the total braking force Fbrk. For example, the brake ECU 61 may calculate the mechanical requested braking force Fmb by subtracting the regenerative requested braking force Fgb from the total braking force Fbrk.

At step S24, the brake ECU 61 transmits the calculated regenerative requested braking force Fgb to the EVECU 31. The EVECU 31 performs the regenerative driving control such that the rotating electric machine 20 generates the received regenerative requested braking force Fgb. The generated power that is supplied from the rotating electric machine 20 to the secondary battery 22 through the inverter 21 increases as the regenerative requested braking force Fgb increases.

In addition, the brake ECU 61 transmits the calculated mechanical requested braking force Fmb to the brake apparatus 60. As a result, the braking force that is applied to the wheels by the braking apparatus 60 is controlled to the mechanical requested braking force Fmb.

Figure 6:
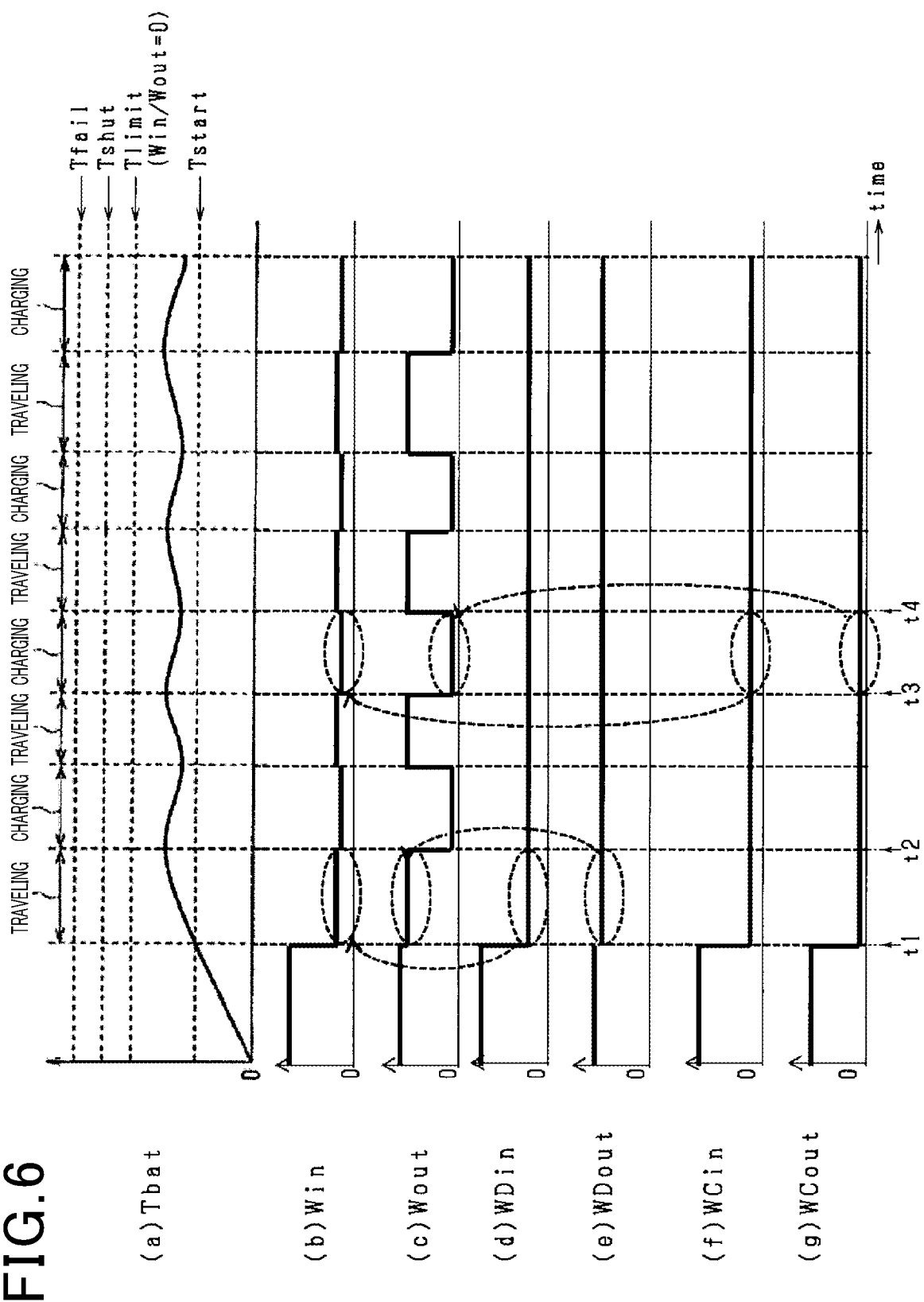
FIG. 6 is a timing chart illustrating a setting mode of each limit value based on battery temperature.

Next, a setting method for the limit values WDout, WDin, WCout, and WCin will be described with reference to FIG. 6. FIGS. 6(a) to (g) correspond to FIGS. 3(a) to (g) above. The "traveling" period shown in FIG. 6 indicates a period over which a negative determination is made at step S12 and an affirmative determination is made at step S20, and the "charging" period indicates a period over which an affirmative determination is made at step S12.

As shown as an example in a period from time t1 to t2, when the battery temperature Tbat is equal to or greater than the limit start temperature Tstart, the battery ECU 30 sets the traveling charging-power limit value WDin and the traveling discharging-power limit value WDout to be values that are less than those when the battery temperature Tbat is less than the limit start temperature Tstart, and sets the traveling charging-power limit value WDin to be less than the traveling discharging-power limit value WDout. As a result, the generated power that is generated by the regenerative driving control when the battery temperature Tbat is high is limited, and a proportion of the mechanical requested braking force Fmb to the total braking force Fbrk is increased. Consequently, the temperature of the secondary battery 22 significantly increasing can be suppressed while necessary braking force is ensured. In addition, because the temperature increase in the secondary battery 22 is suppressed by the regenerative requested braking force Fgb being limited, when the power-running driving control is subsequently performed, the output of the rotating electric machine 20 is not easily limited by the battery temperature Tbat. Consequently, decrease in drivability can be favorably suppressed.

As shown as an example in a period from time t3 to t4, when the battery temperature Tbat is equal to or greater than the limit start temperature Tstart, the battery ECU 30 sets the charging charging-power limit value WCin and the charging discharging-power limit value WCout to values that are less than the traveling charging-power limit value WDin and the traveling discharging-power limit value WDout, and sets the charging discharging-power limit value WCout to a value that is less than the charging charging-power limit value WCin. As a result, significant temperature increase in the secondary battery 22 can be suppressed while charging of the secondary battery 22 by the external charging control is quickly completed.

That is, during the external charging control, electric power may be taken from the secondary battery 22. For example, during external the charging control, the in-cabin air-conditioning apparatus may be used, and the electric compressor that configures the high-voltage auxiliary apparatus 50 may be driven. In this case, when the electric power that is supplied from the power supply control apparatus 41 to the secondary battery 22 is less than power consumption of the electric compressor, electric power is taken from the secondary battery 22 to the electric compressor. In addition, power outage may occur during the external charging control and power supply from the external system power supply 40 may be stopped. In this case, when a duration of the power outage is long and the in-cabin air-conditioning apparatus is being used, electric power is taken from the secondary battery 22 to the electric compressor. Here, electric power is taken from the secondary battery 22 when the DCDC converter that configures the high-voltage auxiliary apparatus 50 is driven during the external charging control, as well.

When the electric power taken from the secondary battery 22 increases, the temperature of the secondary battery 22 significantly increases. As a result, charging time is extended to a required amount of time, and the user is made to wait until charging is completed. Furthermore, when the vehicle 10 is subsequently made to travel, the vehicle 10 cannot be made to travel as a result of battery temperature limitations, and drivability may decrease.

Therefore, according to the present embodiment, the charging discharging-power limit value WCout is set to a value that is less than the charging charging-power limit value WCin. Consequently, the electric power that is taken from the secondary battery 22 during the external charging control can be limited, and significant temperature increase in the secondary battery 22 can be suppressed while charging of the secondary battery 22 by the external charging control is quickly completed.

Third Embodiment

A third embodiment will be described below, mainly focusing on differences with the first embodiment. According to the present embodiment, a setting method for the command charging-power limit value Win and the command discharging-power limit value Wout is modified.

Figure 7:
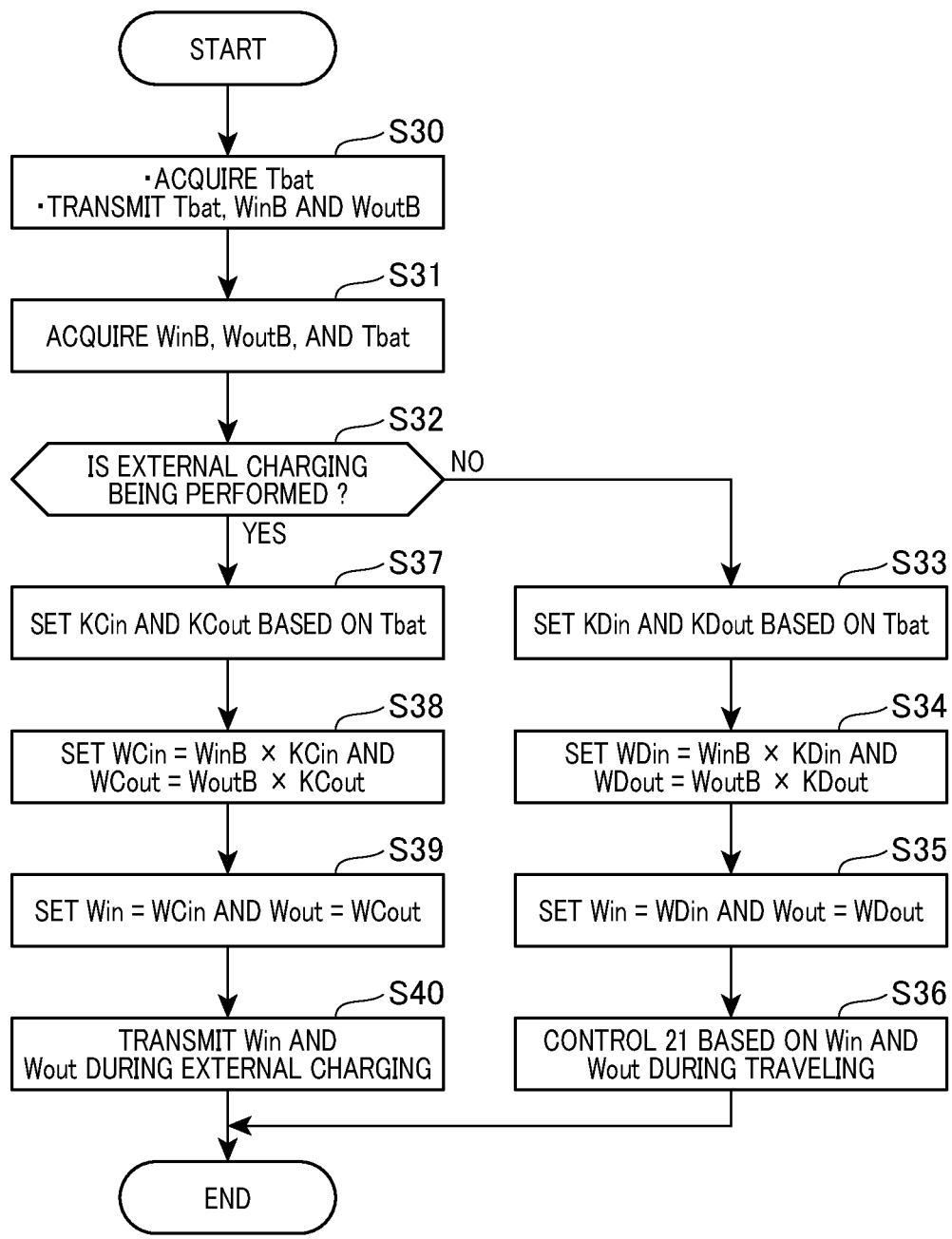
FIG. 7 is a flowchart illustrating steps in a process performed by a brake ECU and an EVECU according to a third embodiment.

FIG. 7 shows steps in a process that is performed through cooperation between the EVECU 31 and the battery ECU 30. For example, this process may be repeatedly performed at a predetermined control cycle.

At step S30, the battery ECU 30 acquires the battery temperature Tbat. This acquisition process corresponds to a "temperature acquiring unit."

The battery ECU 30 sets a charging-power reference limit value WinB and a discharging-power reference limit value WoutB based on the acquired battery temperature Tbat. The reference limit values WinB and WoutB are stored in the memory that is provided in the battery ECU 30 as map information that is associated with the battery temperature Tbat. The battery ECU 30 transmits the set reference limit values WinB and WoutB and the battery temperature Tbat to the EVECU 31.

At step S31, the EVECU 31 acquires the charging-power reference limit value WinB, the discharging-power reference limit value WoutB, and the battery temperature Tbat from the battery ECU 30.

At step S32, in a manner similar to that at step S12 in FIG. 2 above, the EVECU 31 determines whether the external charging control is being performed.

When determined that the eternal charging control is not performed at S32, the EVECU 31 determines that the vehicle 10 is in a state of being made to travel and proceeds to step S33. At step S33, the EVECU 31 sets a traveling discharging-limit coefficient KDout and a traveling charging-limit coefficient KDin based on the acquired battery temperature Tbat. The limit coefficients KDout and KDin are stored in a memory that serves as a storage unit that is provided in the EVECU 31 as map information that is associated with the battery temperature Tbat. Here, the map information of the limit coefficients KDout and KDin that are associated with the battery temperature Tbat may be stored in the memory of the battery ECU 30, and the EVECU 31 may acquire the limit coefficients KDout and KDin from the battery ECU 30.

A coefficient setting process at step S33 will be described with reference to FIG. 8. According to the present embodiment, as shown in FIGS. 8(a) and (b), when the battery temperature Tbat is equal to or less than a threshold temperature Ta that is higher than the limit start temperature Tstart, the traveling discharging-limit coefficient KDout and the traveling charging-limit coefficient KDin are set to 1. Meanwhile, when the battery temperature Tbat is higher than the threshold temperature Ta, the traveling discharging-limit coefficient KDout and the traveling charging-limit coefficient KDin are set to decrease as the battery temperature Tbat increases. When the battery temperature Tbat is the limit temperature Tlimit that is higher than the threshold temperature Ta, the traveling discharging-limit coefficient KDout and the traveling charging-limit coefficient KDin are set to 0. According to the present embodiment, the traveling discharging-limit coefficient KDout and the traveling charging-limit coefficient KDin for each battery temperature Tbat are set to values that are same as each other. However, the setting method is not limited thereto.

Returning to the description of FIG. 7, at step S34, the EVECU 31 sets the traveling charging-power limit value WDin (corresponding to a "second limit value") to a multiplied value of the charging-power reference limit value WinB and the traveling charging-limit coefficient KDin. In addition, the EVECU 31 sets the traveling discharging-power limit value WDout (corresponding to the "second limit value") to a multiplied value of the discharging-power reference limit value WoutB and the traveling discharging-limit coefficient KDout. The traveling charging-power limit value WDin and the traveling discharging-power limit value WDout decrease as the battery temperature Tbat increases when the battery temperature Tbat is higher than the threshold temperature Ta, and become 0 when the battery temperature Tbat is the limit temperature Tlimit.

At step S35, the EVECU 31 sets the command charging-power limit value Win to the traveling charging-power limit value WDin calculated at step S34 and the command discharging-power limit value Wout to the traveling discharging-power limit value WDout calculated at step S34.

At step S36, in a manner similar to that at step S14, when the power-running driving control is being performed, the EVECU 31 sets the electric power that is supplied from the secondary battery 22 to the rotating electric machine 20 through the inverter 21 to be equal to or less than the command discharging-power limit value Wout set at step S35. Meanwhile, when the regenerative driving control is being performed, the EVECU 31 sets the electric power that is supplied from the rotating electric machine 20 to the secondary battery 22 through the inverter 21 to be equal to or less than the command charging-power limit value Win set at step S35.

When determined that the external charging control is being performed at step S32, the EVECU 31 proceeds to step S37. At step S37, the EVECU 31 sets a charging discharging-limit coefficient KCout and a charging charging-limit coefficient KCin based on the acquired battery temperature Tbat. The limit coefficients KCout and KCin are stored in the memory that is provided in the EVECU 31 as map information that is associated with the battery temperature Tbat. Here, the map information of the limit coefficients KCout and KCin that are associated with the battery temperature Tbat may be stored in the memory of the battery ECU 30, and the EVECU 31 may acquire the limit coefficients KCout and KCin from the battery ECU 30.

A coefficient setting process at step S37 will be described with reference to FIG. 8.

According to the present embodiment, as shown in FIGS. 8(a) and (b), when the battery temperature Tbat is equal to or less than the limit start temperature Tstart, the charging discharging-limit coefficient KCout and the charging charging-limit coefficient KCin are set to 1. Meanwhile, when the battery temperature Tbat is higher than the limit start temperature Tstart, the charging discharging-limit coefficient KCout and the charging charging-limit coefficient KCin are set to decrease as the battery temperature Tbat increases. When the battery temperature Tbat is the limit temperature Tlimit, the charging discharging-limit coefficient KCout and the charging charging-limit coefficient KCin are set to 0. According to the present embodiment, the charging discharging-limit coefficient KCout and the charging charging-limit coefficient KCin for each battery temperature Tbat are set to values that are the same as each other. However, the setting method is not limited thereto.

Returning to the description of FIG. 7, at step S38, the EVECU 31 sets the charging charging-power limit value WCin (corresponding to a "first limit value") to a multiplied value of the charging-power reference limit value WinB and the charging charging-limit coefficient KCin. In addition, the EVECU 31 sets the charging discharging-power limit value WCout (corresponding to the "first limit value") to a multiplied value of the discharging-power reference limit value WoutB and the charging discharging-limit coefficient KCout. The charging charging-power limit value WCin and the charging discharging-power limit value WCout decrease as the battery temperature Tbat increases when the battery temperature Tbat is higher than the limit start temperature Tstart, and become 0 when the battery temperature Tbat is the limit temperature Tlimit.

When the battery temperature Tbat is higher than the limit start temperature Tstart, the charging discharging-power limit value WCout and the charging charging-power limit value WCin are less than the traveling discharging-power limit value WDout and the traveling charging-power limit value WDin. Therefore, temperature increase in the secondary battery 22 during the external charging control can be suppressed. In particular, when the battery temperature Tbat is higher than the limit start temperature Tstart and equal to or less than the threshold temperature Ta, the charging discharging-power limit value WCout and the charging charging-power limit value WCin have a greater degree of decrease in relation to the traveling discharging-power limit value WDout and the traveling charging-power limit value WDin as the battery temperature Tbat increases.

At step S39, the EVECU 31 sets the command charging-power limit value Win to the charging charging-power limit value WCin calculated at step S38, and the command discharging-power limit value Wout to the charging discharging-power limit value WCout calculated at step S38.

At step S40, in a manner similar to that at step S16, the EVECU 31 transmits the command charging-power limit value Win and the command discharging-power limit value Wout set at step S39 to the power supply control apparatus 41. As a result, when the secondary battery 22 is charged through the charging inlet 23, the power supply control apparatus 41 performs control such that the electric power that is supplied from the power supply control apparatus 41 to the secondary battery 22 through the charging inlet 23 is equal to or less than the received command charging-power limit value Win. Meanwhile, when electric power is supplied from the secondary battery 22 to the external system power supply 40 through the charging inlet 23 and the power supply control apparatus 41, the power supply control apparatus 41 performs control such that the electric power is equal to or less than the received command discharging-power limit value Wout.

According to the present embodiment described above, following effects are achieved.

The battery temperature Tbat at which the charging discharging-limit coefficient KCout and the charging charging-limit coefficient KCin start to decrease is lower than the battery temperature Tbat at which the traveling discharging-limit coefficient KDout and the traveling charging-limit coefficient start KDin to decrease. Therefore, temperature increase in the secondary battery 22 during the external charging control can be suppressed. Meanwhile, during traveling of the vehicle 10, the battery temperature Tbat at which the traveling discharging-limit coefficient KDout and the traveling charging-limit coefficient KDin start to decrease is higher than the battery temperature Tbat at which the charging discharging-limit coefficient KCout and the charging charging-limit coefficient KCin start to decrease. Therefore, limitations to the charging/discharging power of the secondary battery 22 are more difficult to apply than during the external charging control. Consequently, according to the present embodiment, decrease in drivability can be favorably suppressed while the secondary battery 22 is protected from overheating abnormalities.

In addition, even when a cooling apparatus of the secondary battery 22 that is mounted in the vehicle 10 fails or the cooling apparatus of the secondary battery 22 is not mounted in the vehicle 10, as a result of the process shown in FIG. 7, the secondary battery 22 can be protected from overheating abnormalities.

<Variation Examples According to the Third Embodiment>

Figure 8:
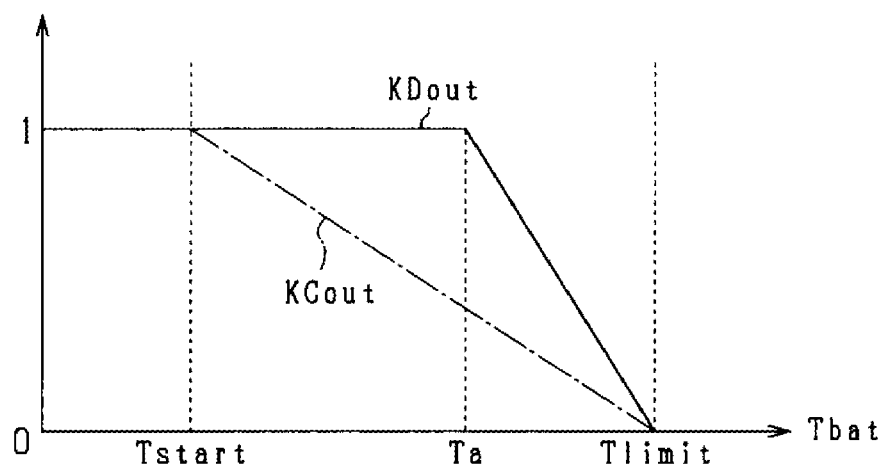
FIGS. 8A and 8B are diagrams illustrating a setting method for a limit coefficient.
Figure 8:
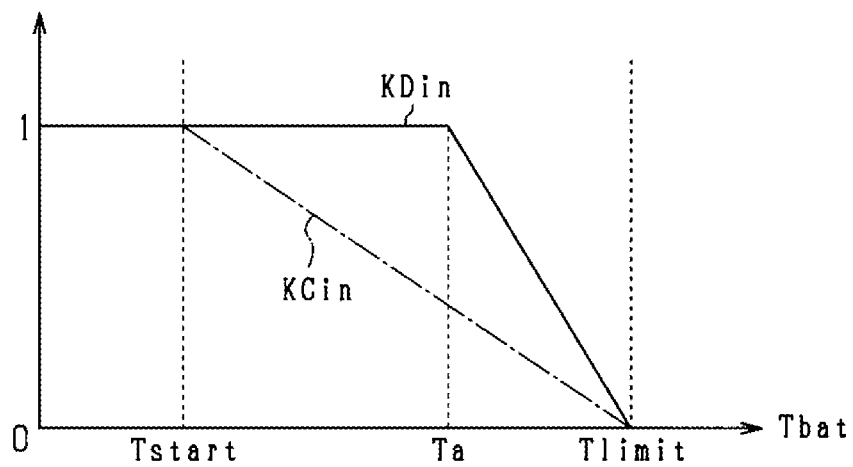
Figure 9A:
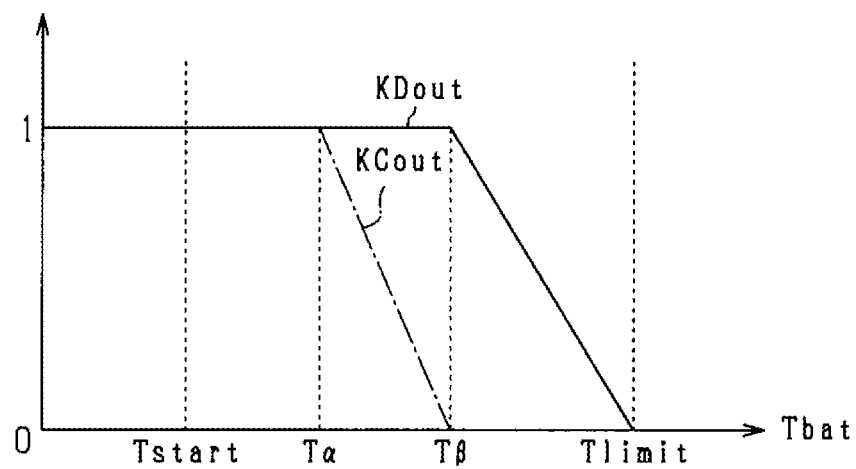
FIGS. 9A and 9B are diagrams illustrating the setting method for the limit coefficient in a variation example according to the third embodiment.
Figure 9B:
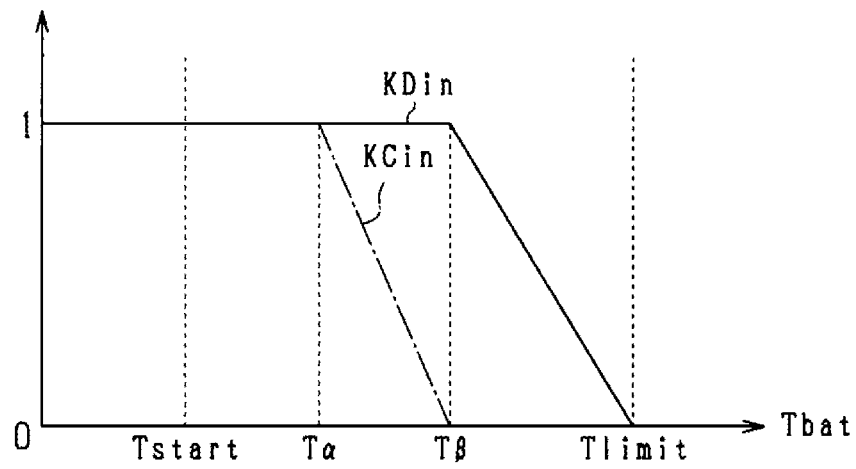

The setting method for the limit coefficients KDout, KDin, KCout, and KCin is not limited to the method shown in FIG. 8 and may, for example, be a method shown in FIG. 9. Here, in the description below, a relationship in which limit start temperature Tstart<first threshold temperature Tα<second threshold temperature Tβ<limit temperature Tlimit is established.

As shown in FIGS. 9(a) and (b), when the battery temperature Tbat is equal to or less than the second threshold temperature Tβ, the traveling discharging-limit coefficient KDout and the traveling charging-limit coefficient KDin are set to 1. Meanwhile, when the battery temperature Tbat is higher than the second threshold temperature Tβ, the traveling discharging-limit coefficient KDout and the traveling charging-limit coefficient KDin are set to decrease as the battery temperature Tbat increases. When the battery temperature Tbat is the limit temperature Tlimit, the traveling discharging-limit coefficient KDout and the traveling charging-limit coefficient KDin are set to 0.

When the battery temperature Tbat is equal to or less than the first threshold temperature Tα, the charging discharging-limit coefficient KCout and the charging charging-limit coefficient KCin are set to 1. Meanwhile, when the battery temperature Tbat is higher than the first threshold temperature Tα, the charging discharging-limit coefficient KCout and the charging charging-limit coefficient KCin are set to decrease as the battery temperature Tbat increases. When the battery temperature Tbat is the second threshold temperature Tβ, the charging discharging-limit coefficient KCout and the charging charging-limit coefficient KCin are set to 0.

Figure 10:
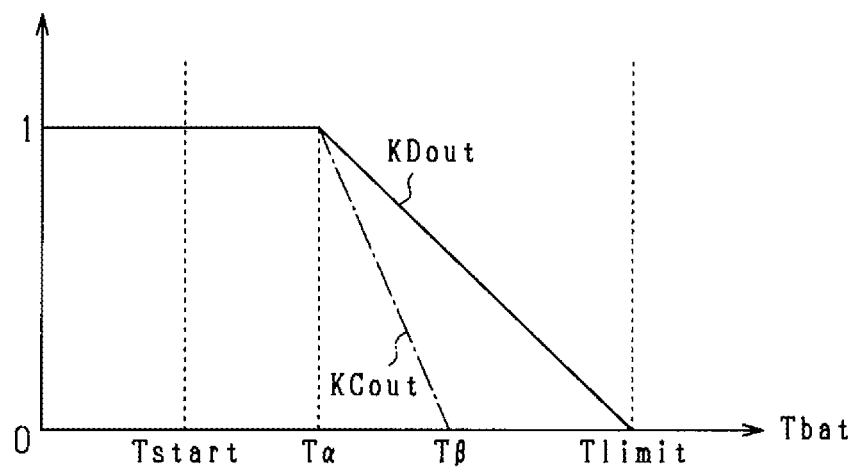
FIGS. 10A and 10B are diagrams illustrating the setting method for the limit coefficient in a variation example according to the third embodiment.
Figure 10:
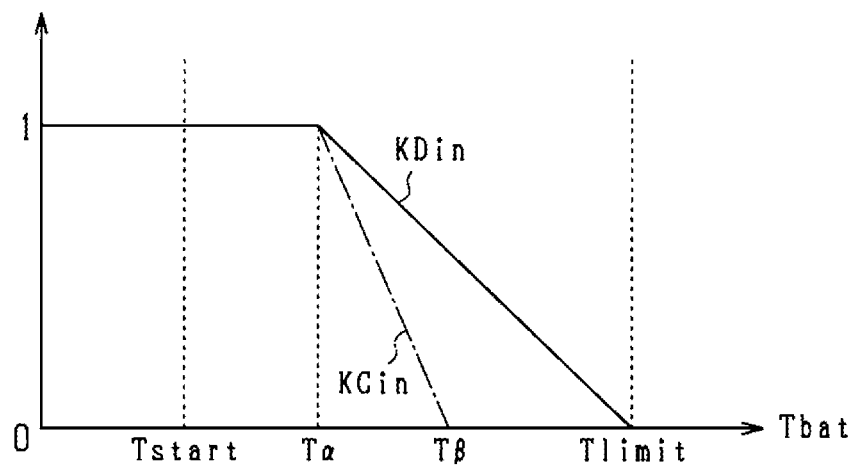

Furthermore, the setting method for the limit coefficients KDout, KDin, KCout, and KCin may, for example, be a method shown in FIG. 10. Specifically, as shown in FIGS. 10(a) and (b), when the battery temperature Tbat is equal to or less than the first threshold temperature Tα, the traveling discharging-limit coefficient KDout, the traveling charging-limit coefficient KDin, the charging discharging-limit coefficient KCout, and the charging charging-limit coefficient KCin are set to 1. Meanwhile when the battery temperature Tbat is higher than the first threshold temperature Tα, the traveling discharging-limit coefficient KDout and the traveling charging-limit coefficient KDin are set to decrease as the battery temperature Tbat increases. When the battery temperature Tbat is the limit temperature Tlimit, the traveling discharging-limit coefficient KDout and the traveling charging-limit coefficient KDin are set to 0.

When the battery temperature Tbat is higher than the first threshold temperature Tα, the charging discharging-limit coefficient KCout and the charging charging-limit coefficient KCin are set to decrease as the battery temperature Tbat increases. When the battery temperature Tbat is the second threshold temperature Tβ, the charging discharging-limit coefficient KCout and the charging charging-limit coefficient KCin are set to 0.

As a result of the setting method in FIG. 10, because limitations are applied when the battery temperature Tbat exceeds the first threshold temperature Ta during both the external charging control and traveling of the vehicle 10, the user can more easily ascertain that the limitations are applied.

Fourth Embodiment

A fourth embodiment will be described below, mainly focusing on differences with the third embodiment. According to the present embodiment, the command charging-power limit value Win and the command discharging-power limit value Wout are set based on a degree of degradation of the secondary battery 22.

Figure 11:
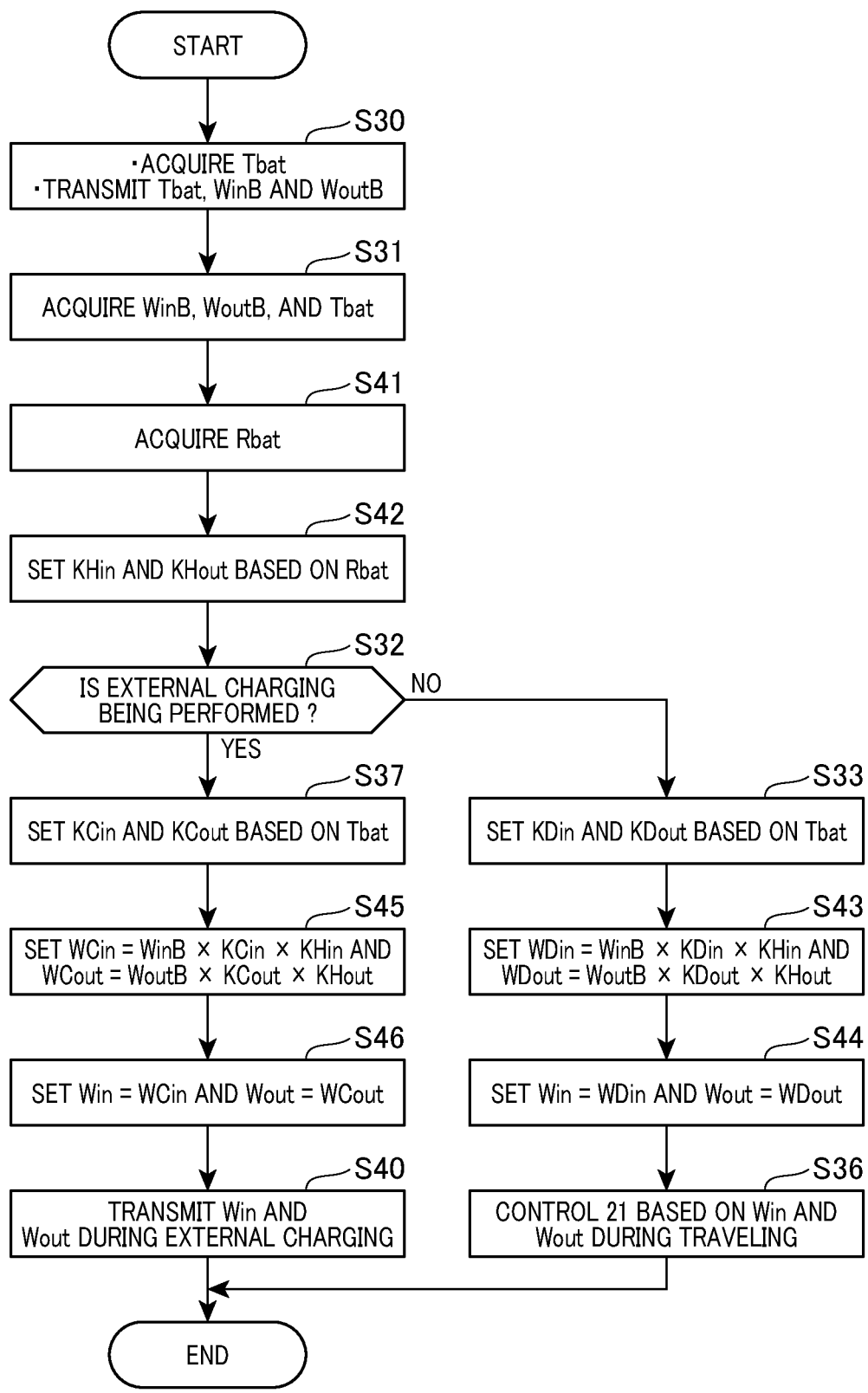
FIG. 11 is a flowchart illustrating steps in a process performed by a brake ECU and an EVECU according to a fourth embodiment.

FIG. 11 shows steps in a process that is performed through cooperation between the EVECU 31 and the battery ECU 30. For example, this process may be repeatedly performed at a predetermined control cycle. Here, in FIG. 11, processes that are identical to the processes shown in FIG. 7 above are given the same reference numbers for convenience.

At step S41, the battery ECU 30 acquires the degree of degradation of the secondary battery 22. According to the present embodiment, an internal resistance Rbat of the secondary battery 22 is used as the degree of degradation. The degree of degradation increases as the internal resistance Rbat increases in relation to a reference value. Here, the internal resistance Rbat can be calculated by various known methods. Therefore, description of a detailed calculation method is omitted. In addition, the process at step S41 corresponds to a "degradation information acquiring unit."

At step S42, the battery ECU 30 sets a charging degradation coefficient KHin and a discharging degradation coefficient KHout based on the acquired internal resistance Rbat. According to the present embodiment, as shown in FIG. 12(a), when the internal resistance Rbat is equal to or less than a first predetermined value H1 (corresponding to a "first predetermined degree"), the charging degradation coefficient KHin is set to 1. Meanwhile, when the internal resistance Rbat is higher than the first predetermined value H1, the charging degradation coefficient KHin is set to decrease as the internal resistance Rbat increases. When the internal resistance Rbat is an upper-limit threshold Hlimit, the charging degradation coefficient KHin is set to 0.

The degradation coefficients decrease as the internal resistance Rbat increases in light of an amount of heat generation in the secondary battery 22 increasing as the internal resistance Rbat increases. Consequently, even when degradation of the secondary battery 22 progresses, protection of the secondary battery 22 based on the degree of degradation can be performed.

In addition, as shown in FIG. 12(b), when the internal resistance Rbat is equal to or less than a second predetermined value H2 (corresponding to a "second predetermined degree"), the discharging degradation coefficient KHout is set to 1. Meanwhile, when the internal resistance Rbat is greater than the second predetermined value H2, the discharging degradation coefficient KHout is set to decrease as the internal resistance Rbat increases. When the internal resistance Rbat is the upper-limit threshold Hlimit, the discharging degradation coefficient KHout is set to 0. Here, the first predetermined value H1 and the second predetermined value H2 may be values that are the same as each other or differing values.

Here, the degradation coefficients KHin and KHout may be stored in the memory that is provided in the battery ECU 30 as map information that is associated with the internal resistance Rbat. In addition, the map information of the degradation coefficients KHin and KHout that are associated with the internal resistance Rbat may be stored in the memory of the battery ECU 30. In this case, the EVECU 31 may set the degradation coefficients KHin and KHout based on the internal resistance Rbat and the map information that are acquired from the battery ECU 30.

Returning to the description of FIG. 11 above, at S43, the EVECU 31 sets the traveling charging-power limit value WDin to a multiplied value of the charging-power reference limit value WinB, the traveling charging-limit coefficient KDin, and the charging degradation coefficient KHin set at step S42. In addition, the EVECU 31 sets the traveling discharging-power limit value WDout to a product of the discharging-power reference limit value WoutB, the traveling discharging-limit coefficient KDout, and the discharging degradation coefficient KHout set at step S42.

At step S44, the EVECU 31 sets the command charging-power limit value Win to the traveling charging-power limit value WDin calculated at step S43 and the command discharging-power limit value Wout to the traveling discharging-power limit value WDout calculated at step S43.

Meanwhile, at step S45, the EVECU 31 sets the charging charging-power limit value WCin to a multiplied value of the charging-power reference limit value WinB, the charging charging-limit coefficient KCin, and the charging degradation coefficient KHin set at step S42. In addition, the EVECU 31 sets the charging discharging-power limit value WCout to a multiplied value of the discharging-power reference limit value WoutB, the charging discharging-limit coefficient KCout, and the discharging degradation coefficient KHout set at step S42.

At step S46, the EVECU 31 sets the command charging-power limit value Win to the charging charging-power limit value WCin calculated at step S45 and the command discharging-power limit value Wout to the charging discharging-power limit value WCout calculated at step S45.

According to the present embodiment described above, even when the degradation of the secondary battery 22 progresses, decrease in drivability can be suppressed while the secondary battery 22 is protected from overheating abnormalities.

<Variation Examples According to the Fourth Embodiment>

The charging degradation coefficient KHin that is used to set the traveling charging-power limit value WDin and the charging charging-power limit value WCin is not limited to a coefficient that is shared between the traveling charging-power limit value WDin and the charging charging-power limit value WCin, and may be coefficients that are separately set for the traveling charging-power limit value WDin and the charging charging-power limit value WCin.

In addition, the discharging degradation coefficient KHout that is used to set the traveling discharging-power limit value WDout and the charging discharging-power limit value WCout is not limited to a coefficient that is shared between the traveling discharging-power limit value WDout and the charging discharging-power limit value WCout, and may be coefficients that are separately set for the traveling discharging-power limit value WDout and the charging discharging-power limit value WCout.

The degree of degradation of the secondary battery 22 at step S41 is not limited to the internal resistance and may be, for example, a state of health (SOC) of the secondary battery 22.

Fifth Embodiment

A fifth embodiment will be described below, mainly focusing on differences with the first embodiment. According to the present embodiment, an external charging control method is modified.

Figure 13:
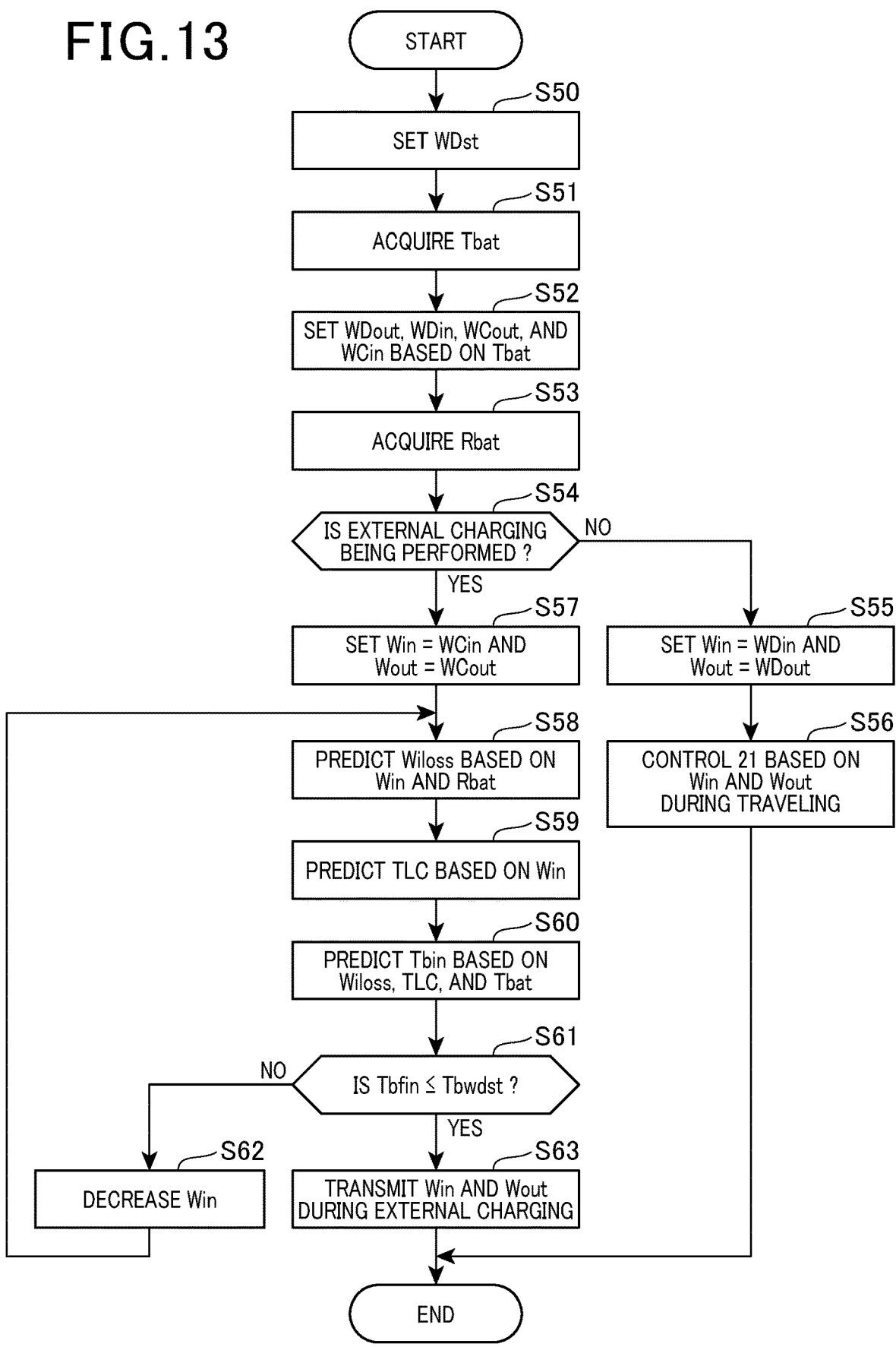
FIG. 13 is a flowchart illustrating steps in a process performed by a brake ECU and an EVECU according to a fifth embodiment.

FIG. 13 shows steps in a process that is performed through cooperation between the EVECU 31 and the battery ECU 30.

At step S50, the EVECU 31 sets start requested power WDst (corresponding to a "traveling requested power"). The start requested power WDst is a lower-limit value of the discharging power of the secondary battery 22 that is required to rotate the driving wheel and start the vehicle 10 by the power-running driving control after completion of the external charging control. Specifically, for example, the start requested power WDst is the discharging power of the secondary battery 22 that is required for a traveling speed of the vehicle 10 to reach a predetermined speed after the vehicle 10 is started on a flat road that has no road gradient or has a small gradient. For example, the start requested power WDst is a value that is prescribed by an experiment or calculation.

At step S51, the battery ECU 30 acquires the current battery temperature Tbat. The battery ECU 30 transmits the acquired battery temperature Tbat to the EVECU 31.

At step S52, in a manner similar to that at step S11, the battery ECU 30 sets the traveling discharging-power limit value WDout, the traveling charging-power limit value WDin, the charging discharging-power limit value WCout, and the charging charging-power limit value WCin based on the acquired battery temperature Tbat. The battery ECU 30 transmits the set limit values WDout, WDin, WCout, and WCin to the EVECU 31.

At step S53, in a manner similar to that at step S41, the battery ECU 30 acquires the current internal resistance Rbat of the secondary battery 22. The battery ECU 30 transmits the acquired internal resistance Rbat to the EVECU 31.

At step S54, in a manner similar to that at step S12, the EVECU 31 determines whether the external charging control is being performed.

When determined that the external charging control is not performed at step S54, the EVECU 31 proceeds to step S55. At step S55, the EVECU 31 sets the command charging-power limit value Win to the received traveling charging-power limit value WDin and the command discharging-power limit value Wout to the received traveling discharging-power limit value WDout.

At subsequent step S56, in a manner similar to that at step S14, the EVECU 31 performs the power-running driving control or the regenerative driving control during traveling of the vehicle 10.

When determined that the external charging control is being performed at step S54, that is, when determined that an execution instruction for the external charging control is issued, the EVECU 31 proceeds to step S57. At step S57, the EVECU 31 sets the command charging-power limit value Win to the received charging charging-power limit value WCin and the command discharging-power limit value Wout to the received charging discharging-power limit value WCout.

At step S58, the EVECU 31 predicts loss (hereafter, charging loss Wiloss) that occurs in the secondary battery 22 when the secondary battery 22 is assumed to be charged at the set command charging-power limit value Win, based on the command charging-power limit value Win set at step S57 and the internal resistance Rbat acquired at step S53. The charging loss Wiloss increases as the internal resistance Rbat increases or the command charging-power limit value Win increases.

At step S59, the EVECU 31 predicts a charging time TLC that is an amount of time from start of charging of the secondary battery 22 by the external charging control to completion of charging of the secondary battery 22, based on the command charging-power limit value. Specifically, the EVECU 31 predicts the charging time TLC based on the command charging-power limit value Win and the current SOC that is acquired from the battery ECU 30. According to the present embodiment, completion of the charging of the secondary battery 22 refers to the SOC reaching a target SOC that indicates a fully charged state of the secondary battery 22.

At step S60, the EVECU 31 predicts a charging completion temperature Tbfin that is the temperature of the secondary battery 22 when the current external charging control is assumed to be completed, based on the charging loss Wiloss predicted at step S58, the charging time TLC predicted at step S59, and the battery temperature Tbat acquired at step S51. Specifically, an increase amount ΔTb from a current temperature of the secondary battery 22 is calculated based on the charging loss Wiloss and the charging time TLC. Then, the charging completion temperature Tbfin is calculated by the calculated increase amount ΔTb being added to the battery temperature Tbat.

At step S61, the EVECU 31 determines whether the predicted charging completion temperature Tbfin is equal to or less than a requested temperature Tbwdst. The requested temperature Tbwdst is the temperature of the secondary battery 22 when a maximum dischargeable power of the secondary battery 22 is the start requested power WDst. Specifically, for example, the requested temperature Tbwdst is the temperature of the secondary battery 22 when the traveling discharging-power limit value WDout is the start requested power WDst in the map information at step S52.

When determined that the predicted charging completion temperature Tbfin exceeds the requested temperature Tbwdst, the EVECU 31 determines that the maximum dischargeable power of the secondary battery 22 when the current external charging control is completed falls below the start requested power WDst, and proceeds to step S62. At step S62, the EVECU 31 decreases a newest command charging-power limit value Win (corresponding to a "prescribed power") used at steps S58 and S59 by a predetermined amount and proceeds to step S58. At step S58, the EVECU 31 predicts the charging loss Wiloss again based on the command charging-power limit value Win that has been decreased by the predetermined amount. At step S59, the EVECU 31 predicts the charging time TLC again based on the command charging-power limit value Win that has been decreased by the predetermined amount. Then, at step S61, the EVECU 31 determines again whether the predicted charging completion temperature Tbfin is equal to or less than the requested temperature Tbwdst.

As a result of the processes at steps S58 to S62, the command charging-power limit value Win that is used for prediction of the charging completion temperature Tbfin is decreased until the predicted charging completion temperature Tbfin is equal to or less than the requested temperature Tbwdst.

When determined that the predicted charging completion temperature Tbfin is equal to or less than the requested temperature Tbwdst, the EVECU 31 proceeds to step S63. At step S63, the EVECU 31 transmits the newest command charging-power limit value Win that is used for the prediction of the charging completion temperature Tbfin and the command discharging-power limit value Wout set at step S57 to the power supply control apparatus 41. When the secondary battery 22 is charged through the charging inlet 23, the power supply control apparatus 41 performs control such that the electric power that is supplied from the power supply control apparatus 41 to the secondary batter 22 through the charging inlet 23 is equal to or less than the received command charging-power limit value Win. For example, the power supply control apparatus 41 may perform control such that the electric power that is supplied from the power supply control apparatus 41 to the secondary batter 22 through the charging inlet 23 is the received command charging-power limit value Win.

According to the present embodiment described above, when the execution instruction for the external charging control is issued, the charging completion temperature Tbfin is predicted before the start of charging of the secondary battery 22. Then, the command charging-power limit value Win that is used in the external charging control is set to the command charging-power limit value Win at which the predicted charging completion temperature Tbfin is determined to be equal to or less than the requested temperature Tbwdst. Therefore, when the vehicle 10 is made to travel after the current external charging control is actually completed, the maximum dischargeable power of the secondary battery 22 can be set closer to the start requested power WDst. Consequently, decrease in drivability can be favorably suppressed, while the secondary battery 22 is protected from overheating abnormalities.

In particular, according to the present embodiment, the start requested power WDst is set to the discharging power of the secondary battery 22 that is required to drive the driving wheel and start the vehicle 10 by the power-running driving control after completion of the external charging control. Consequently, the vehicle 10 not being able to travel immediately after completion of the external charging control can be favorably prevented.

Sixth Embodiment

A sixth embodiment will be described below, mainly focusing on differences with the fifth embodiment. According to the present embodiment, the external charging control method is modified.

Figure 14:
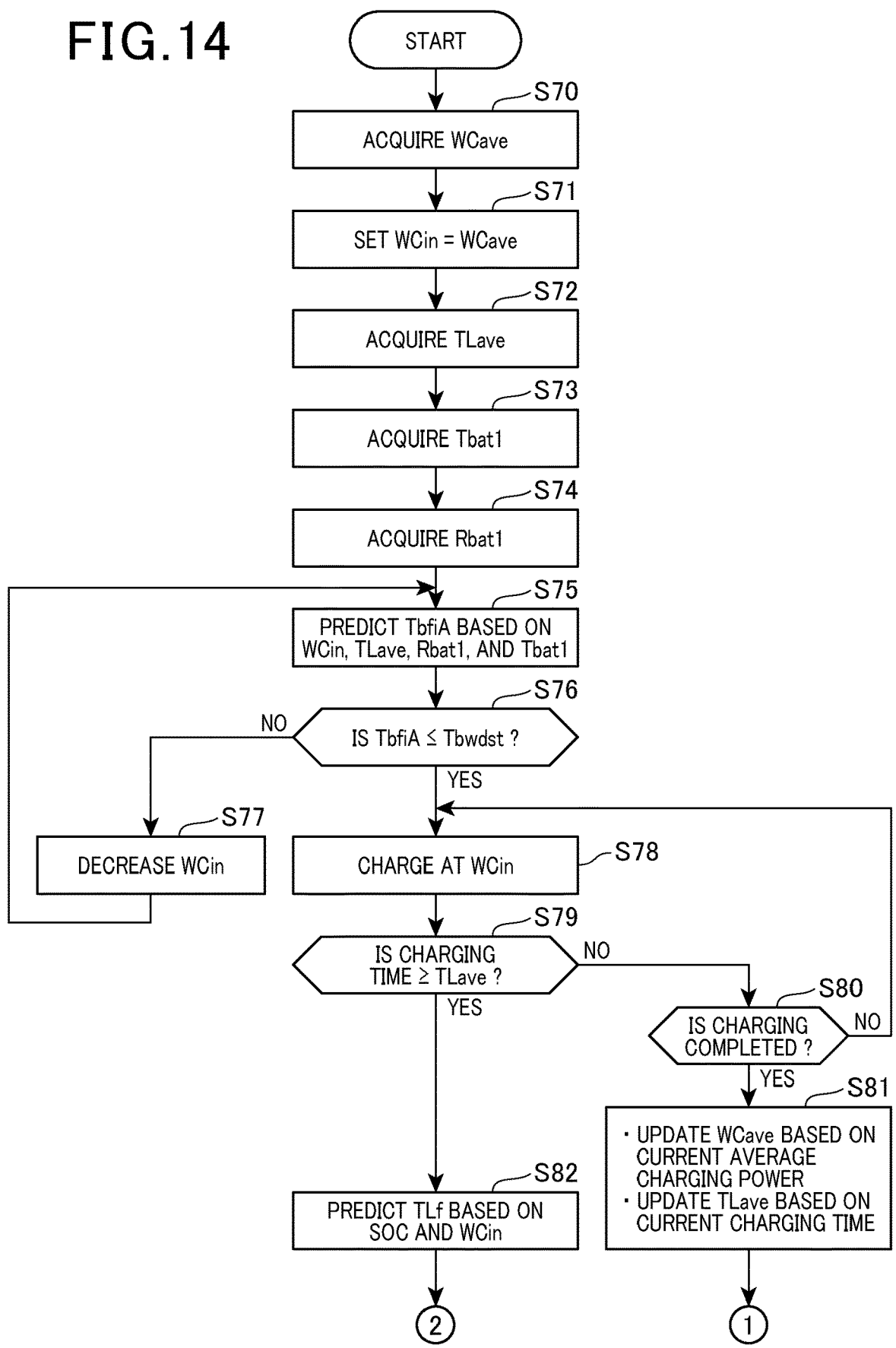
FIG. 14 is a flowchart illustrating steps in a process performed by a brake ECU and an EVECU according to a sixth embodiment.
Figure 15:
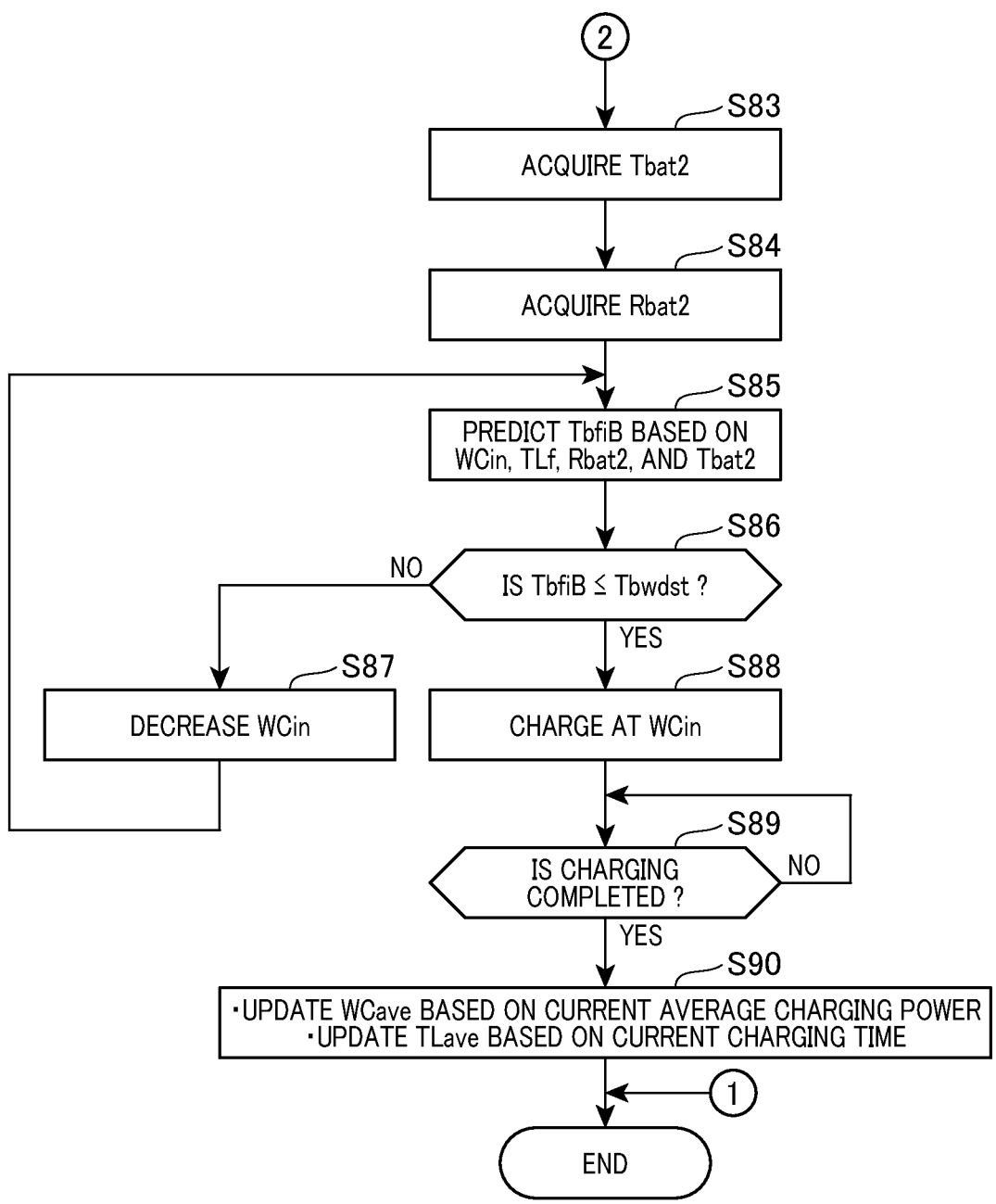
FIG. 15 is a flowchart illustrating steps in a process performed by the brake ECU and the EVECU according to the sixth embodiment.

FIG. 14 and FIG. 15 show steps in an external charging control process that is performed through cooperation between the EVECU 31 and the battery ECU 30.

At step S70, the EVECU 31 acquires a newest average charging power WCave that is stored in an own memory. The average charging power WCave is a time average value of the charging power from the start of charging of the secondary battery 22 by the external charging control to the completion of charging of the secondary battery 22.

At step S71, the EVECU 31 sets the charging charging-power limit value WCin to the average charging power WCave acquired at step S70.

At step S72, the EVECU 31 acquires a newest average charging time TLave that is stored in the own memory. The average charging time TLave is an average value of an amount of time required from the start of charging of the secondary battery 22 by the external charging control to the completion of charging of the secondary battery 22.

At step S73, the battery ECU 30 acquires a first battery temperature Tbat1 that is the current temperature of the secondary battery 22. The battery ECU 30 transmits the acquired first battery temperature Tbat1 to the EVECU 31.

At step S74, the battery ECU 30 acquires a first internal resistance Rbat1 that is the current internal resistance of the secondary battery 22. The battery ECU 30 transmits the acquired first internal resistance Rbat1 to the EVECU 31.

At step S75, the EVECU 31 predicts a first charging completion temperature TbfiA that is the temperature of the secondary battery 22 when the current external charging control to charge the secondary battery 22 at the set command charging-power limit value Win is assumed to be completed, based on the charging charging-power limit value WCin set at step S71, the average charging time TLave acquired at step S72, the first internal resistance Rbat1, and the first battery temperature Tbat1.

At step S76, the EVECU 31 determines whether the predicted first charging completion temperature TbfiA is equal to or less than the requested temperature Tbwdst.

When determined that the predicted first charging completion temperature TbfiA exceeds the requested temperature Tbwdst, the EVECU 31 determines that the maximum dischargeable power of the secondary battery 22 when the current external charging control is completed falls below the start requested power WDst and proceeds to step S77. At step S77, the EVECU 31 decreases the new command charging-power limit value Win used at step S75 by a predetermined amount and proceeds to step S75. At step S75, the EVECU 31 predicts the first charging completion temperature TbfiA again based on the command charging-power limit value Win that is decreased by the predetermined amount. Then, at step S76, the EVECU 31 determines again whether the predicted first charging completion temperature TbfiA is equal to or less than the requested temperature Tbwdst.

As a result of the processes at steps S75 to S77, the command charging-power limit value Win that is used for prediction of the first charging completion temperature TbfiA is decreased until the predicted first charging completion temperature TbfiA is equal to or less than the requested temperature Tbwdst.

When determined that the predicted first charging completion temperature TbfiA is equal to or less than the requested temperature Tbwdst, the EVECU 31 proceeds to step S78. At step S78, the EVECU 31 transmits the newest command charging-power limit value Win that is used for prediction of the first charging completion temperature TbfiA to the power supply control apparatus 41. The power supply control apparatus 41 performs control such that the electric power that is supplied from the power supply control apparatus 41 to the secondary battery 22 through the charging inlet 23 is the received command charging-power limit value Win.

At step S79, the EVECU 31 determines whether the average charging time TLave acquired at step S72 has elapsed from the start of charging of the second battery 22 by the process at step S78.

When a negative determination is made at step S79, the EVECU 31 proceeds to step S80 and determines whether the charging of the secondary battery 22 is completed. When determined that the charging of the secondary battery 22 is not completed, the EVECU 21 proceeds to step S78.

When determined that the charging of the secondary battery 22 is completed, the EVECU 31 proceeds to step S81. At step S81, the EVECU 31 updates the average charging time TLave based on an actual charging time that is required from the start of charging of the secondary battery 22 by the process at step S78 until the charging is determined to be completed at step S80. For example, the EVECU 31 may set a simple average value or a weighted average value of a current actual charging time and the newest average charging time TLave that is stored in the memory as the average charging time TLave after the update. The EVECU 31 stores the updated average charging time TLave in the memory. At step S72 of a next external charging control, the updated average charging time TLave is acquired.

In addition, at step S81, the EVECU 31 calculates a time average value (hereafter, an actual average charging power) of the charging power of the secondary battery 22 from the start of charging of the secondary battery 22 until the charging is determined to be completed, based on the current actual charging time and each charging power of the secondary battery 22 from the start of charging of the secondary battery 22 by the process at step S78 until the charging is determined to be completed at step S80. The EVECU 31 updates the average charging power WCave that is stored in the memory based on the calculated current actual average charging power.

For example, the EVECU 31 may set a simple average value or a weighted average value of the current actual average charging power and the newest average charging power WCave stored in the memory as the average charging power WCave after the update. The EVECU 31 stores the updated average charging power WCave in the memory. At step S70 of the next external charging control, the updated average charging power WCave is acquired.

When an affirmative determination is made at step S79, the EVECU 31 proceeds to step S82. The EVECU 31 predicts a remaining charging time TLf that is the amount of time from the start of charging of the secondary battery 22 by the external charging control to the completion of charging of the secondary battery 22, based on the current SOC that is acquired from the battery ECU 30 and the newest charging charging-power limit value WCin used at step S78, when the charging power of the secondary battery 22 is assumed to be the charging charging-power limit value WCin.

At step S83, the battery ECU 30 acquires a second battery temperature Tbat2 that is the current temperature of the secondary battery 22. The battery ECU 30 transmits the acquired second battery temperature Tbat2 to the EVECU 31.

At step S84, the battery ECU 30 acquires a second internal resistance Rbat2 that is the current internal resistance of the secondary battery 22. The battery ECU 30 transmits the acquired second internal resistance Rbat2 to the EVECU 31.

At step S85, the EVECU 31 predicts a second charging completion temperature TbfiB that is the temperature of the secondary battery 22 when the external charging control to charge the secondary battery 22 at the newest command charging-power limit value Win is assumed to be completed, based on the newest charging charging-power limit value WCin, the remaining charging time TLf predicted at step S82, the second internal resistance Rbat2, and the second battery temperature Tbat2.

At step S86, the EVECU 31 determines whether the predicted second charging completion temperature TbfiB is equal to or less than the requested temperature Tbwdst.

When determined that the predicted second charging completion temperature TbfiB exceeds the requested temperature Tbwdst, the EVECU 31 proceeds to step S87. At step S87, the EVECU 31 decreases the newest command charging-power limit value Win used at step S85 by a predetermined amount and proceeds to step S85. At step S85, the EVECU 31 predicts the second charging completion temperature TbfiB again based on the command charging-power limit value Win that is decreased by the predetermined amount. Then, at step S86, the EVECU 31 determines again whether the predicted second charging completion temperature TbfiB is equal to or less than the requested temperature Tbwdst.

When determined that the predicted second charging completion temperature TbfiB is equal to or less than the requested temperature Tbwdst, the EVECU 31 proceeds to step S88. At step S88, the EVECU 31 transmits the newest command charging-power limit value Win that is used to predict the second charging completion temperature TbfiB to the power supply control apparatus 41. The power supply control apparatus 41 performs control such that the electric power that is supplied from the power supply control apparatus 41 to the secondary battery 22 through the charging inlet 23 is the received command charging-power limit value Win.

At step S89, the EVECU 31 determines whether the charging of the secondary battery 22 is completed. When determined that the charging of the secondary battery 22 is completed, the EVECU 31 proceeds to step S90 and updates the average charging time TLave that is stored in the memory in a manner similar to that at step S81, based on the actual charging time required from the start of charging of the secondary battery 22 by the process at step S88 until the charging is determined to be completed at step S89.

In addition, in a manner similar to that at step S81, the EVECU 31 calculates the actual average charging power of the secondary battery 22 from the start of charging of the secondary battery 22 until the charging is determined to be completed, based on the above-described actual charging time and each charging power of the secondary battery 22 from the start of charging of the secondary battery 22 by the process at step S88 until the charging is determined to be completed at step S89. The EVECU 31 updates the average charging power WCave that is stored in the memory based on the calculated current actual average charging power.

According to the present embodiment described above, in a manner similar to that according to the sixth embodiment, decrease in drivability can be favorably suppressed while the secondary battery 22 is protected from overheating abnormalities.

Seventh Embodiment

A seventh embodiment will be described below, mainly focusing on differences with the fifth and sixth embodiments. According to the present embodiment, the external charging control method is modified.

Figure 16:
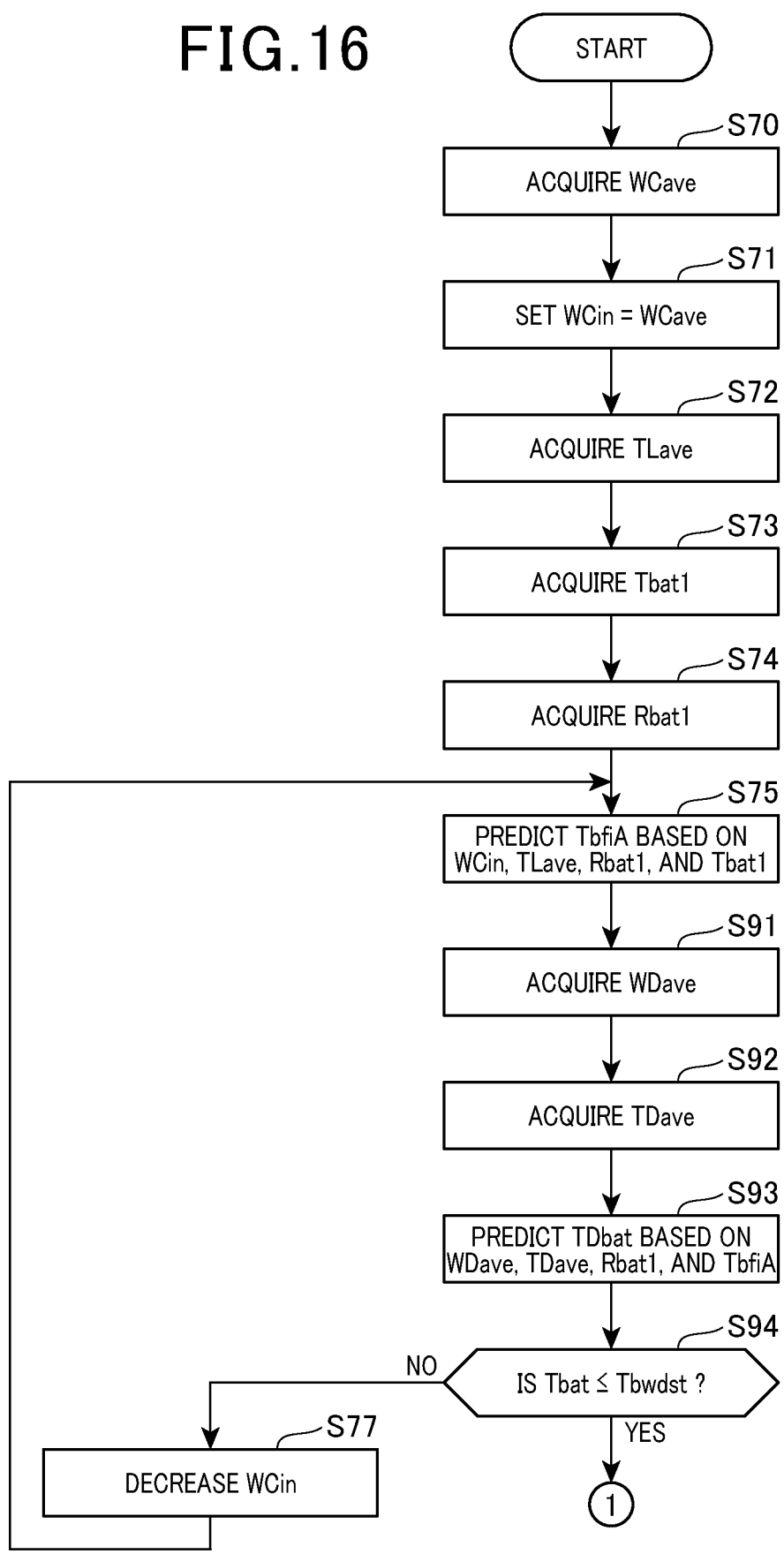
FIG. 16 is a flowchart illustrating steps in a process performed by a brake ECU and an EVECU according to a seventh embodiment.
Figure 17:
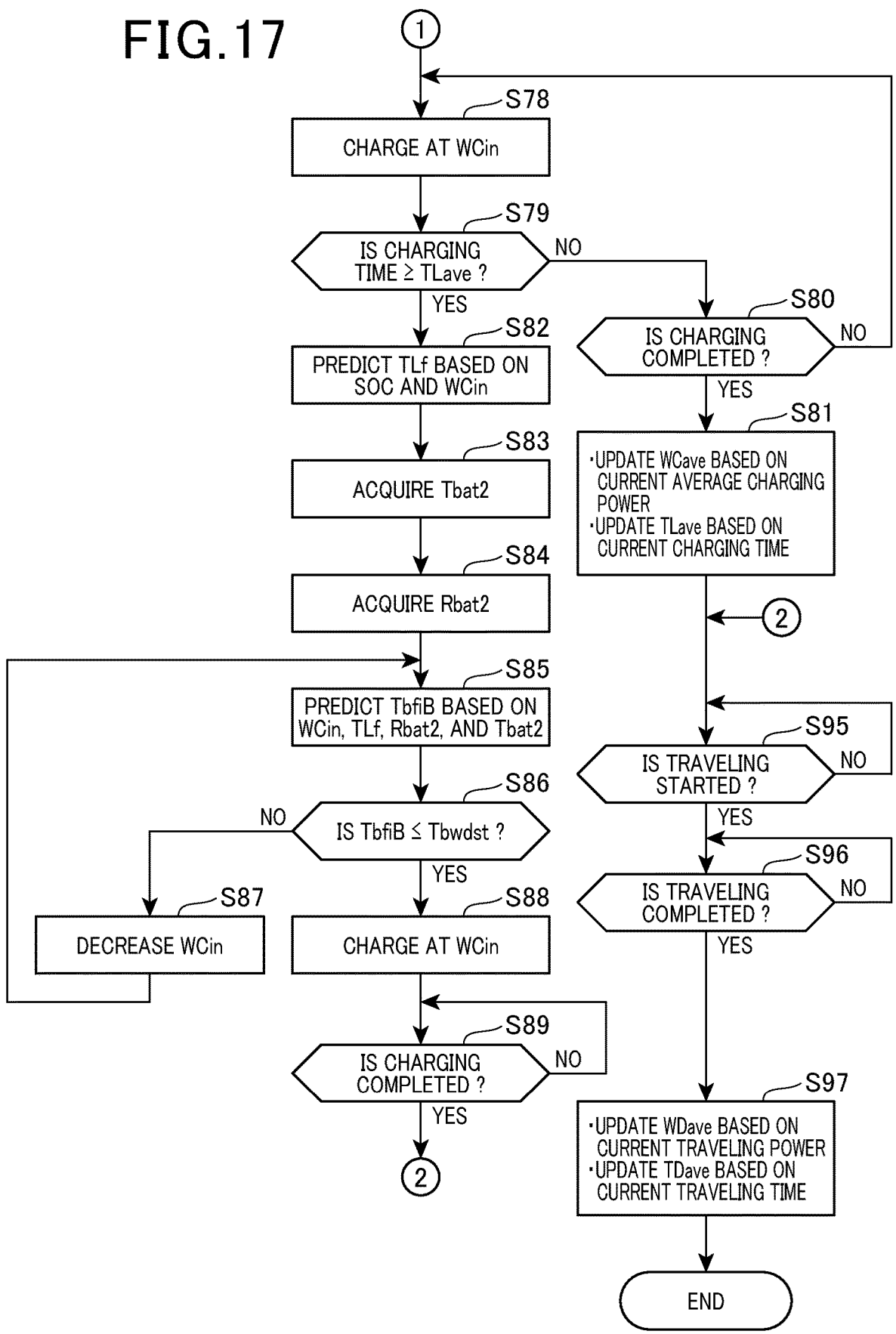
FIG. 17 is a flowchart illustrating steps in a process performed by the brake ECU and the EVECU according to the seventh embodiment.

FIG. 16 and FIG. 17 show steps in a process that is performed through cooperation between the EVECU 31 and the battery ECU 30. Here, in FIG. 16 and FIG. 17, processes that are identical to the processes shown in FIG. 14 and FIG. 15 above are given the same reference numbers for convenience.

After completion of the process at step S75, the EVECU 31 proceeds to step S91 and acquires an average traveling power WDave that is stored in the own memory. The average traveling power WDave is a time average value of the discharging power of the secondary battery 22 over a single traveling cycle. The single traveling cycle is a period from start of traveling of the vehicle 10 after the completion of the external charging control until the external charging control is started again.

At step S92, the EVECU 31 acquires an average traveling time TDave that is stored in the own memory. The average traveling time TDave is an average value of an amount of time that is required for a single traveling cycle.

At step S93, the EVECU 31 predicts a traveling completion temperature TDbat (corresponding to a "second temperature") that is the temperature of the secondary battery 22 when a next single traveling cycle is assumed to be completed, based on the average traveling power WDave acquired at step S91, the average traveling time TDave acquired at step S92, the first internal resistance Rbat1, and the first charging completion temperature TbfiA (corresponding to a "first temperature").

At step S94, the EVECU 31 determines whether the predicted traveling completion temperature TDbat is equal to or less than the requested temperature Tbwdst. Here, the requested temperature Tbwdst according to the present embodiment is the temperature of the secondary battery 22 when the maximum dischargeable power of the secondary battery 22 is a specific traveling power (corresponding to a "traveling requested power"). For example, the specific traveling power is the discharging power of the secondary battery 22 that is required for the vehicle 10 to steadily travel at a prescribed speed on a flat road that has no road gradient or a small gradient. For example, the specific traveling power is a value that is prescribed by an experiment or calculation.

As a result of the processes at steps S75, S91 to S94, and S77, the command charging-power limit value Win that is used for prediction of the traveling completion temperature TDbat is decreased until the predicted traveling completion temperature TDbat is equal to or less than the requested temperature Tbwdst.

When an affirmative determination is made at step S94, the EVECU 31 proceeds to step S78. The processes at steps S78 to S89 are similar to the processes described according to the sixth embodiment.

After the completion of the charging of the secondary battery 22, at step S95, the EVECU 31 determines whether to start the traveling of the vehicle 10. After determining that the traveling is started at step S95, the EVECU 31 determines whether the traveling of the vehicle 10 is completed at step S96. When determined that the traveling of the vehicle 10 is completed, that is, when determined that the current single traveling cycle is completed, the EVECU 31 proceeds to step S97.

At step S97, the EVECU 31 updates the average traveling time TDave based on the amount of time (hereafter, an actual cycle time) required for the current single traveling cycle. For example, the EVECU 31 may set a simple average value or a weighted average value of the current actual cycle time and the newest average traveling time TDave that is stored in the memory as the average traveling time TDave after the update. The EVECU 31 stores the updated average traveling time TDave in the memory. At step S92 of the next external charging control, the updated average traveling time TDave is acquired.

In addition, the EVECU 31 calculates a time average value (hereafter, an actual average discharging power) of the discharging power of the secondary battery 22 in the current single traveling cycle, based on the current actual cycle time and each discharging power of the secondary battery 22 in the current single traveling cycle. The EVECU 31 updates the average traveling power WDave that is stored in the memory based on the calculated current actual average discharging power. For example, the EVECU 31 may set a simple average value or a weighted average value of the current actual average discharging power and the newest average traveling power WDave that is stored in the memory as the average traveling power WDave after the update. The EVECU 31 stores the updated average traveling power WDave in the memory. At step S91 of the next external charging control, the updated average traveling power WDave is acquired.

According to the present embodiment described above, in the next single traveling cycle that is performed after the current external charging control, the maximum dischargeable power of the secondary battery 22 can be prevented from significantly decreasing in relation to the specific traveling power. Consequently, decrease in drivability in the next single traveling cycle can be favorably suppressed, while the secondary battery 22 is protected from overheating abnormalities.

OTHER EMBODIMENTS

Here, the above-described embodiments may be modified in the following manner.

A process that uses the degradation coefficients described according to the fourth embodiment may be applied to the fifth to seventh embodiments.

According to the first and second embodiments, when the battery temperature Tbat is equal to or greater than the limit temperature Tlimit, the battery ECU 30 may set the limit values WDout, WDin, WCout, and WCin to be values that are less than those when Tstart≤Tbat≤Tlimit and greater than 0.

The process shown in FIG. 2 may be performed by only the EVECU 31, of the battery ECU 30 and the EVECU 31. In this case, for example, the map information may be stored in the storage unit that is provided in the EVECU 31, and the battery temperature Tbat may be transmitted from the battery ECU 30 to the EVECU 31.

According to the first and second embodiments, when the battery temperature Tbat is equal to or greater than the limit temperature Tlimit, the charging charging-power limit value WCin and the charging discharging-power limit value WCout may be set to values that are slightly greater than 0 without being set to 0.

According to the first and second embodiments, a ratio of the charging discharging-power limit value WCout and the charging charging-power limit value WCin, a ratio of the traveling discharging-power limit value WDout and the traveling charging-power limit value WDin, a ratio of the charging discharging-power limit value WCout and the traveling discharging-power limit value WDout, and a ratio of the charging charging-power limit value WCin and the traveling charging-power limit value WDin may be adjusted based on the battery temperature Tbat. Consequently, balance between the temperature increase in the secondary battery 22 and the electric power that can be inputted and outputted to and from of the secondary battery 22 can be achieved. The charging time of the secondary battery 22, performance of apparatuses that are used during charging, traveling performance of the vehicle 10, and braking performance of the vehicle 10 can be adjusted for more comfort.

When the power-running driving control is being performed, the EVECU 31 may perform control of the inverter 21 such that a discharge current that flows from the secondary battery 22 to the inverter 21 is equal to or less than a traveling discharging-current limit value IDout. In addition, when the regenerative driving control is being performed, the EVECU 31 may perform control of the inverter 21 such that a charging current that flows to from the inverter 21 to the secondary battery 22 is equal to or less than a traveling charging-current limit value IDin, with regenerative power generation of the rotating electric machine 20. The traveling discharging-current limit value IDout and the traveling charging-current limit value IDin are set based on the battery temperature Tbat. Here, the traveling discharging-current limit value IDout and the traveling charging-current limit value IDin correspond to the second limit value.

The power supply control apparatus 41 may perform control such that a charging current that is supplied from the power supply control apparatus 41 to the secondary battery 22 through the charging inlet 23 is equal to or less than a charging charging-current limit value ICin. The power supply control apparatus 41 may also perform control such that a discharging current that is supplied from the secondary battery 22 to the power supply control apparatus 41 through the charging inlet 23 is equal to or less than a charging discharging-current limit value ICout. The charging discharging-current limit value ICout and the charging charging-current limit value ICin are set based on the battery temperature Tbat. Here, the charging discharging-current limit value ICout and the charging charging-current limit value ICin correspond to the first limit value.

The charging discharging-current limit value ICout and the charging charging-current limit value ICin are set to be values that are less than the traveling discharging-current limit value IDout and the traveling charging-current limit value IDin. A configuration in which a controlled variable is a current instead of electric power is based on the temperature of the secondary battery 22 being significantly dependent on the current that flows to the secondary battery 22.

The inverter 21 and the secondary battery 22 may be electrically connected with a DCDC converter therebetween. The DCDC converter steps up the output voltage of the secondary battery 22 and supplies the output voltage to the inverter 21, and steps down the voltage from the inverter 21 and supplies the voltage to the secondary battery 22.

The vehicle in which the control apparatus is mounted is not limited to the vehicle that includes only the rotating electric machine as the traveling power source, and may be a vehicle that includes an internal combustion engine in addition to the rotating electric machine as the traveling power source. In this case as well, effects corresponding to the effects achieved according to the above-described embodiments can be achieved.

The power storage apparatus is not limited to the storage battery and may be, for example, a capacitor with a large capacitance.

The control apparatus and the method thereof described in the present disclosure may be actualized by a dedicated computer that is provided so as to be configured by a processor and a memory, the processor being programmed to provide one or a plurality of functions that are realized by a computer program. Alternatively, the control apparatus and the method thereof described in the present disclosure may be actualized by a dedicated computer that is provided by a processor being configured by a single dedicated hardware logic circuit or more. Still alternatively, the control apparatus and the method thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer.

While the present disclosure has been described with reference to embodiments thereof, it is to be understood that the present disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A control apparatus for a vehicle that includes a power storage apparatus, an inverter that is electrically connected to the power storage apparatus, and a rotating electric machine that is electrically connected to the inverter, the control apparatus comprising one or more electronic control units configured to:
   determine whether to perform either a first control in which the power storage apparatus is charged from a power supply facility external to the vehicle during stopping of the vehicle, or a second control in which electric power is transferred between the rotating electric machine and the power storage apparatus through the inverter during traveling of the vehicle;
   perform, in response to determining that the first control is being performed, control of the inverter to set a controlled variable that is either an electric power or a current and that is transferred between the power supply facility and the power storage apparatus to be equal to or less than a first limit value, and perform, in response to determining that the second control is being performed, control of the inverter to set the controlled variable that is either the electric power or the current and that is transferred between the rotating electric machine and the power storage apparatus to be equal to or less than a second limit value;
   with a period from start of traveling of the vehicle after completion of the first control until the first control is started again being a single traveling cycle,
      predict, before start of charging of the power storage apparatus when an execution instruction for a current first control is issued, a first temperature that is a temperature of the power storage apparatus when the current first control in which the power storage apparatus is charged at a prescribed power is assumed to be completed, based on an average time from start to completion of the first control and an average charging power of the power storage apparatus from the start to the completion of the first control,
      predict a second temperature that is a temperature of the power storage apparatus when a next single traveling cycle that is performed after the current first control is assumed to be completed, based on the predicted first temperature, an average discharging power of the power storage apparatus in the single traveling cycle, and an average time that is required for the single traveling cycle,
      determine whether the predicted second temperature is equal to or less than a requested temperature that is the temperature of the power storage apparatus that sets a maximum dischargeable power of the power storage apparatus to a traveling requested power of the vehicle, and decrease the prescribed power that is used to predict the first temperature until the predicted second temperature, which is based in part on the predicted first temperature, is determined to be equal to or less than the requested temperature, and
      set the first limit value used for charging in the first control to the prescribed power that results in the predicted second temperature is being determined to be equal to or less than the requested temperature.

2. The control apparatus according to claim 1, wherein:
   only the rotating electric machine is mounted in the vehicle as a traveling power source that is capable of transmitting power to a driving wheel.

3. A control apparatus for a vehicle that includes a power storage apparatus, an inverter that is electrically connected to the power storage apparatus, and a rotating electric machine that is electrically connected to the inverter, the control apparatus comprising one or more electronic control units configured to:
   determine whether to perform either a first control in which electric power is transferred between a power supply facility external to the vehicle and the power storage apparatus during stopping of the vehicle, or a second control in which electric power is transferred between the rotating electric machine and the power storage apparatus through the inverter during traveling of the vehicle;
   perform, in response to determining that the first control is being performed, control of the inverter to set a controlled variable that is an electric power or a current and that is transmitted from the power supply facility to the power storage apparatus to be equal to or less than a charging charging-power limit value or to set the controlled variable that is the electric power or the current and that is transmitted from the power storage apparatus to the power supply facility to be equal to or less than a charging discharging-power limit value;
   perform, in response to determining that the second control is being performed, control of the inverter to set the controlled variable that is the electric power or the current and that is transmitted from the rotating electric machine to the power storage apparatus during regenerative power generation by the rotating electric machine to be equal to or less than a traveling charging-power limit value or to set the controlled variable that is the electric power or the current and that is transmitted from the power storage apparatus to the rotating electric machine to be equal to or less than a traveling discharging-power limit value; and
   (i) set the charging discharging-power limit value and the charging charging-power limit value used for charging in the first control to be less than the traveling discharging-power limit value and the traveling charging-power limit value used for travelling in the second control, (ii) set the charging discharging-power limit value used for charging in the first control to a value that is less than the traveling discharging-power limit value used for travelling in the second control, and (iii) set the charging charging-power limit value used for charging in the first control to a value that is less than the traveling charging-power limit value used for travelling in the second control.

4. The control apparatus according to claim 3, wherein:
   only the rotating electric machine is mounted in the vehicle as a traveling power source that is capable of transmitting power to a driving wheel.

5. A control apparatus for a vehicle that includes a power storage apparatus, an inverter that is electrically connected to the power storage apparatus, and a rotating electric machine that is electrically connected to the inverter, the control apparatus comprising one or more electronic control units configured to:
   determine whether to perform either a first control in which electric power is transferred between a power supply facility external to the vehicle and the power storage apparatus during stopping of the vehicle, or a second control in which electric power is transferred between the rotating electric machine and the power storage apparatus through the inverter during traveling of the vehicle;

perform, in response to determining that the first control is being performed, control of the inverter to set a controlled variable that is either an electric power or a current and that is transferred between the power supply facility and the power storage apparatus to be equal to or less than a first limit value, and perform, in response to determining that the second control is being performed, control of the inverter to set the controlled variable that is either the electric power or the current and that is transferred between the rotating electric machine and the power storage apparatus to be equal to or less than a second limit value;

acquire a temperature of the power storage apparatus;

set the first limit value used for charging in the first control to a value that is less than the second limit value used for travelling in the second control, in response to the acquired temperature being equal to or greater than a limit start temperature, and set the second limit value used for travelling in the second control to a value that is less than a value associated with a case when the acquired temperature is less than the limit start temperature, in response to the acquired temperature being equal to or greater than a limit temperature that is greater than the limit start temperature.

6. The control apparatus according to claim 5, wherein:
the one or more electronic control units set the second limit value to 0 when the acquired temperature is equal to or greater than the limit temperature.

7. The control apparatus according to claim 6, wherein:
only the rotating electric machine is mounted in the vehicle as a traveling power source that is capable of transmitting power to a driving wheel.

8. The control apparatus according to claim 5, wherein:
only the rotating electric machine is mounted in the vehicle as a traveling power source that is capable of transmitting power to a driving wheel.

9. A control apparatus for a vehicle that includes a power storage apparatus, an inverter that is electrically connected to the power storage apparatus, and a rotating electric machine that is electrically connected to the inverter, the control apparatus comprising one or more electronic control units configured to:

determine whether to perform either a first control in which electric power is transferred between a power supply facility external to the vehicle and the power storage apparatus during stopping of the vehicle, or a second control in which electric power is transferred between the rotating electric machine and the power storage apparatus through the inverter during traveling of the vehicle;

perform, in response to determining that the first control is being performed, control of the inverter to set a controlled variable that is an electric power or a current and that is transmitted from the power supply facility to the power storage apparatus to be equal to or less than a charging charging-power limit value or to set the controlled variable that is the electric power or the current and that is transmitted from the power storage apparatus to the power supply facility to be equal to or less than a charging discharging-power limit value, and perform, in response to determining that the second control is being performed, control of the inverter to set the controlled variable that is either the electric power or the current and that is transferred between the rotating electric machine and the power storage apparatus to be equal to or less than a second limit value; and set the charging discharging-power limit value and the charging charging-power limit value used for charging in the first control to be less than the second limit value used for travelling in the second control, and set the charging discharging-power limit value used for charging in the first control to a value that is less than the charging charging-power limit value used for charging in the first control.

10. The control apparatus according to claim 9, wherein:
only the rotating electric machine is mounted in the vehicle as a traveling power source that is capable of transmitting power to a driving wheel.

11. A control apparatus for a vehicle that includes a power storage apparatus, an inverter that is electrically connected to the power storage apparatus, a rotating electric machine that is electrically connected to the inverter, and a mechanical brake apparatus that generates braking force by applying frictional force on a wheel, the control apparatus comprising one or more electronic control units configured to:

determine whether to perform either a first control in which electric power is transferred between a power supply facility external to the vehicle and the power storage apparatus during stopping of the vehicle, or a second control in which electric power is transferred between the rotating electric machine and the power storage apparatus through the inverter during traveling of the vehicle;

perform, in response to determining that the first control is being performed, control of the inverter to set a controlled variable that is either an electric power or a current and that is transferred between the power supply facility and the power storage apparatus to be equal to or less than a first limit value, perform, in response to determining that the second control is being performed during traveling of the vehicle, control of the inverter to set the controlled variable that is the electric power or the current and that is transmitted from the rotating electric machine to the power storage apparatus during regenerative power generation by the rotating electric machine to be equal to or less than a traveling charging-power limit value or to set the controlled variable that is the electric power or the current and that is transmitted from the power storage apparatus to the rotating electric machine to be equal to or less than a traveling discharging-power limit value, perform, during execution of the second control, control of the inverter to cause the rotating electric machine to generate a regenerative braking force that is generated during the regenerative power generation of the rotating electric machine, and cause the mechanical brake apparatus to generate a mechanical braking force, based on a total braking force to be applied to the wheel; and set the first limit value used for charging in the first control to be less than the traveling discharging-power limit value and the traveling charging-power limit value used for travelling in the second control, and set the traveling charging-power limit value used for travelling in the second control to be a value that is less than the traveling discharging-power limit value used for travelling in the second control.

12. The control apparatus according to claim 11, wherein:
only the rotating electric machine is mounted in the vehicle as a traveling power source that is capable of transmitting power to a driving wheel.

* * * * *